June 8, 1943.  C. DODEGGE  2,321,545
TICKET MACHINE
Filed Feb. 24, 1942   11 Sheets-Sheet 1
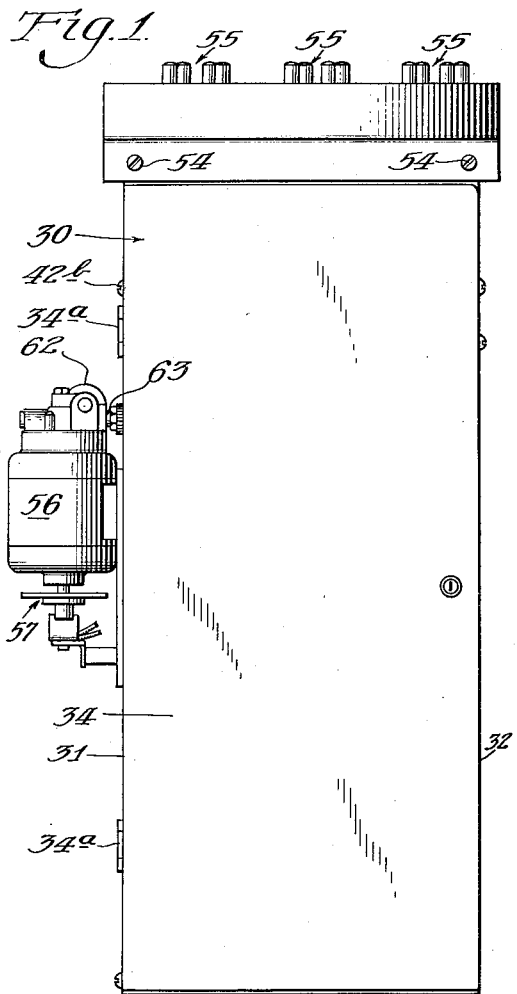
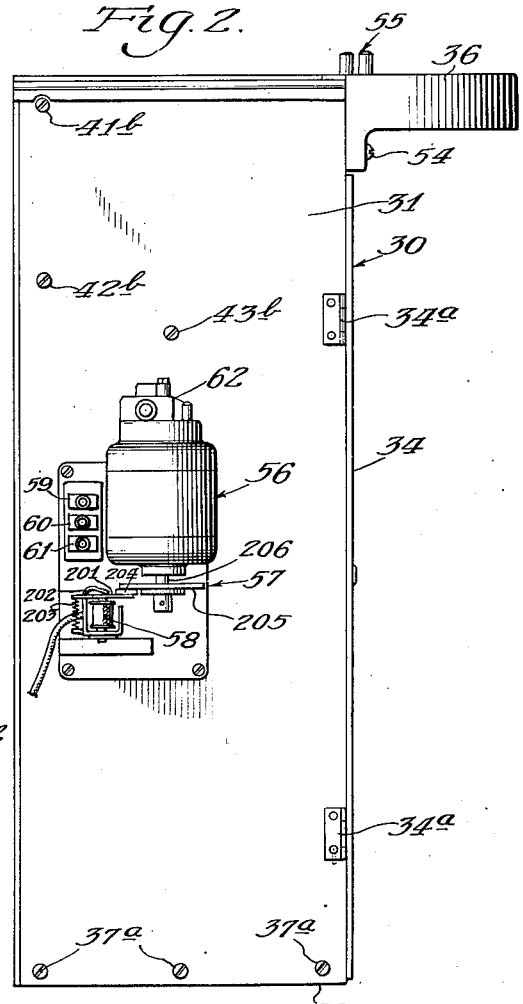
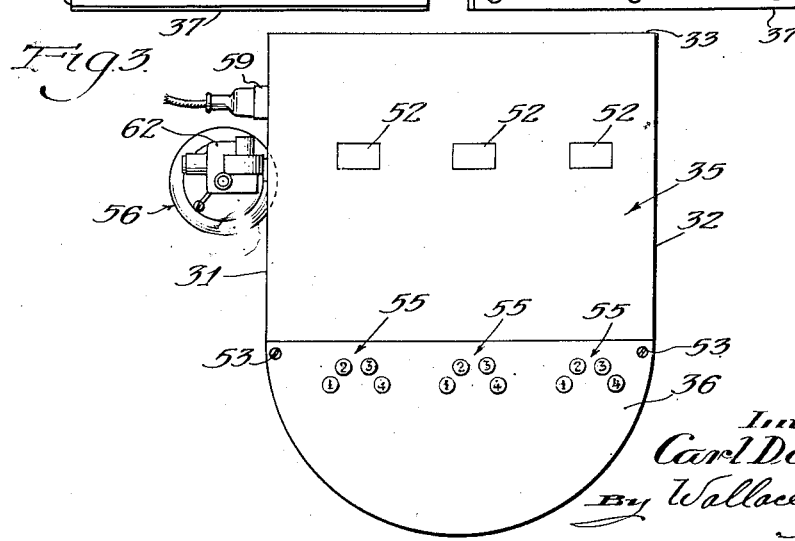
Inventor:
Carl Dodegge
By Wallace & Cannon
Attorneys

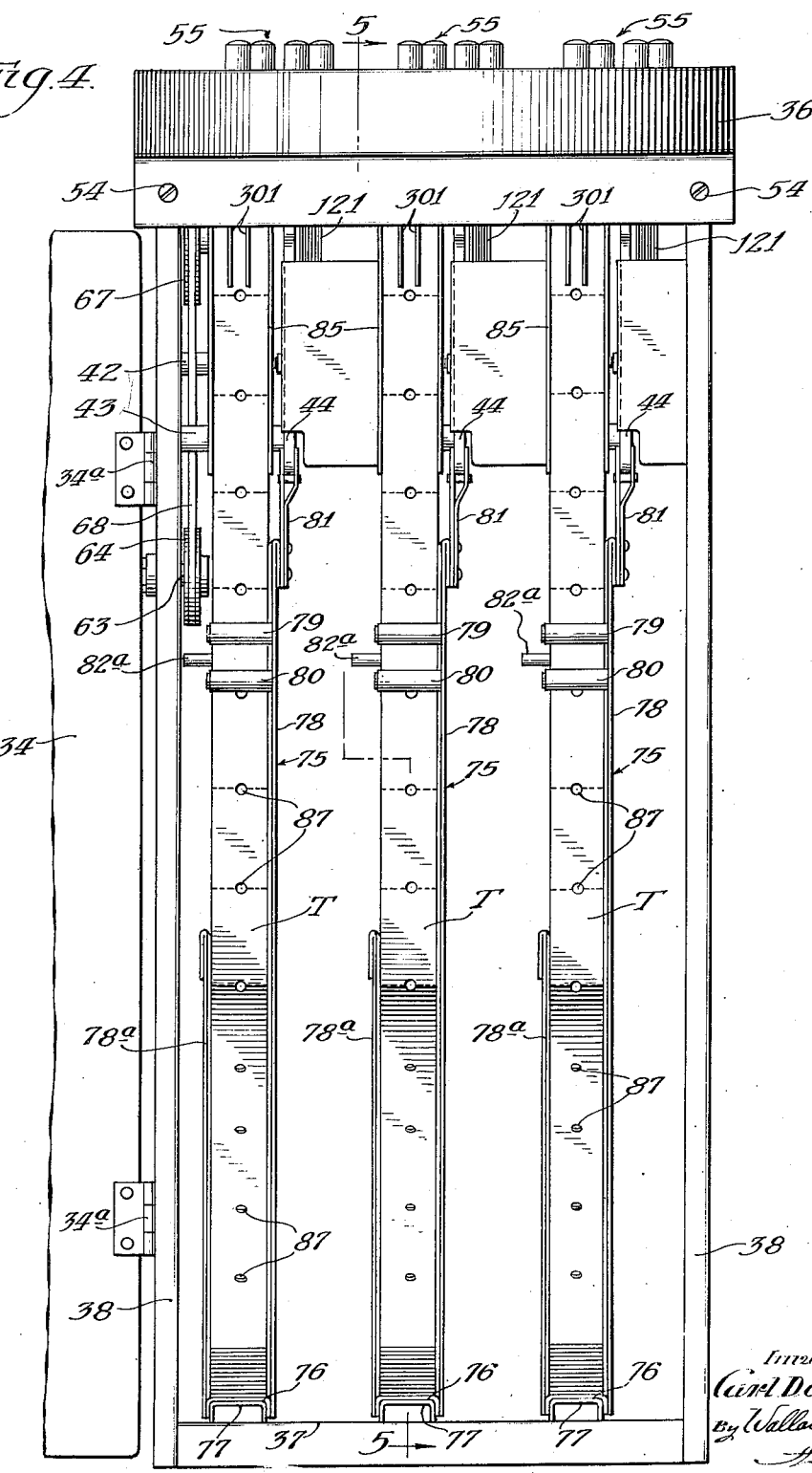

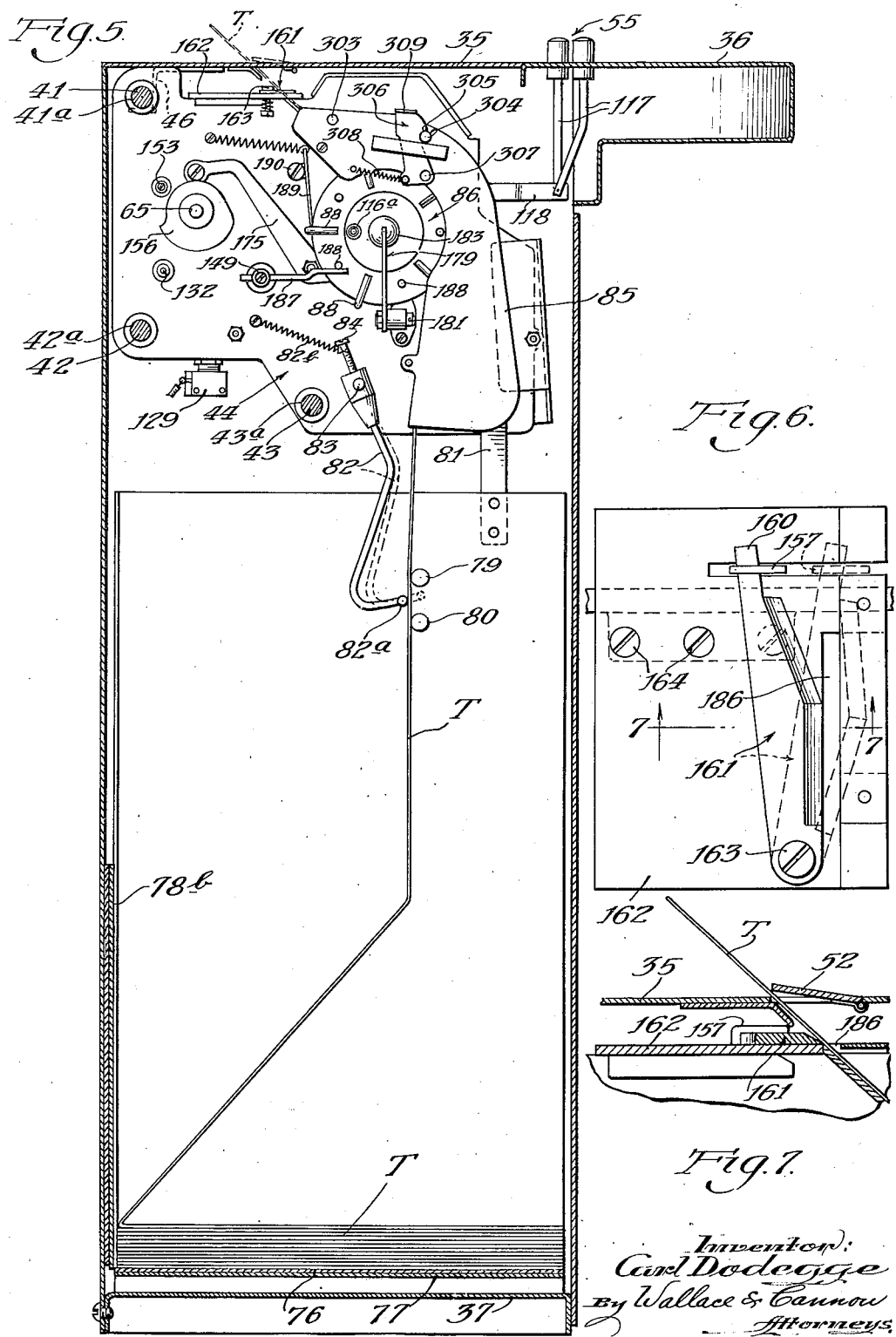

June 8, 1943.  C. DODEGGE  2,321,545
TICKET MACHINE
Filed Feb. 24, 1942   11 Sheets-Sheet 4

Inventor:
Carl Dodegge
By Wallace & Cannow
Attorneys.

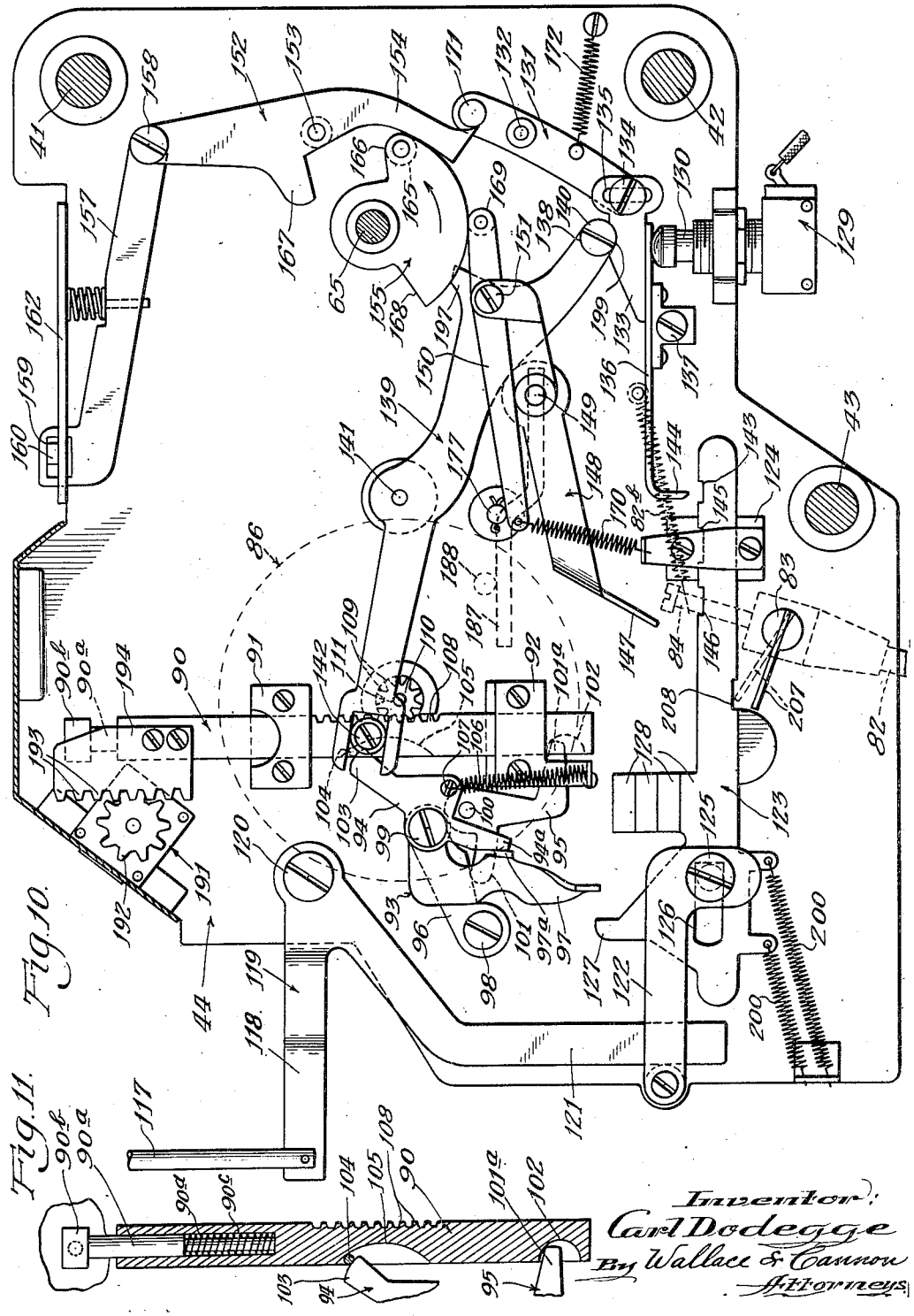

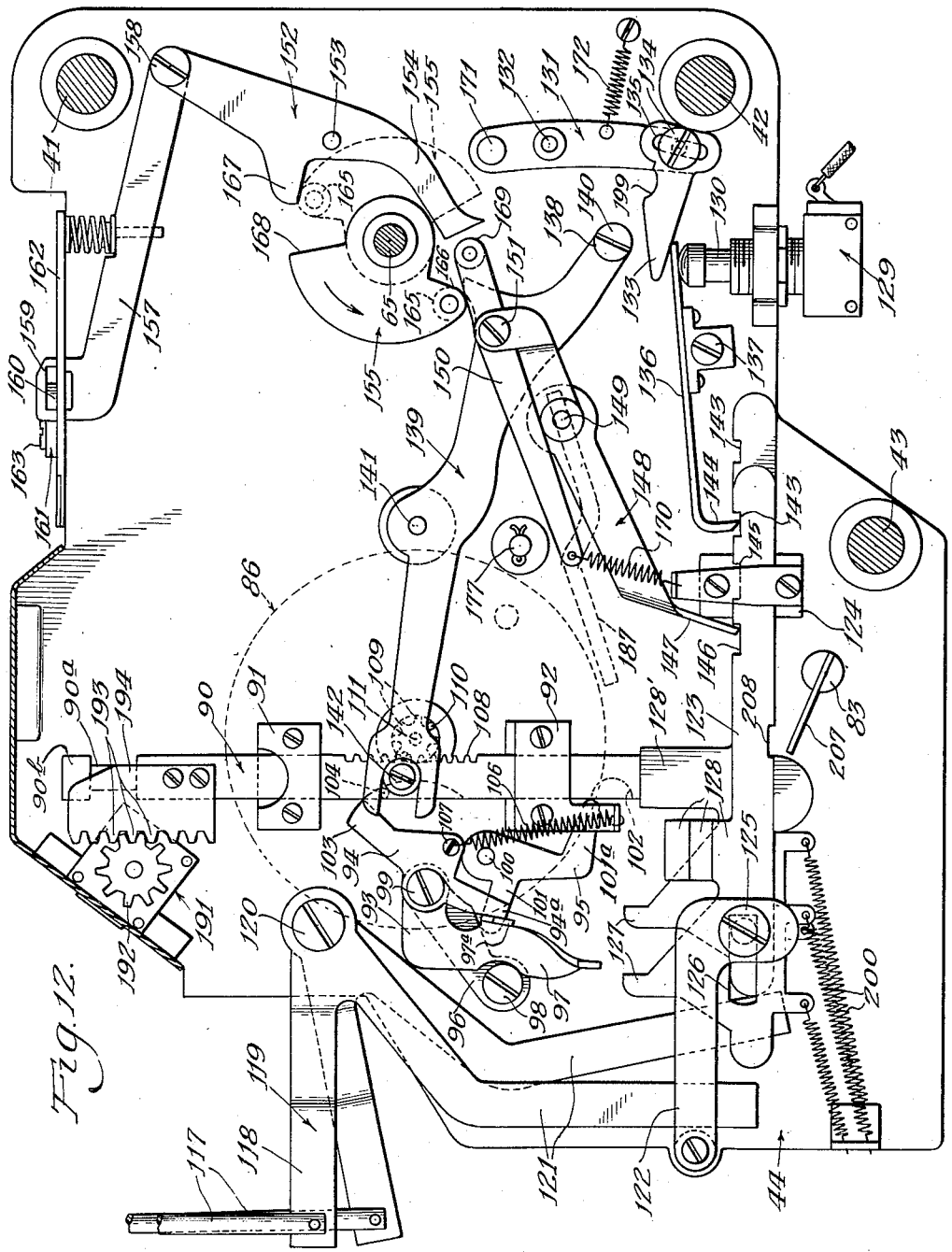

June 8, 1943.　　C. DODEGGE　　2,321,545
TICKET MACHINE
Filed Feb. 24, 1942　　11 Sheets-Sheet 7

Inventor:
Carl Dodegge
By Wallace & Cannon
Attorneys

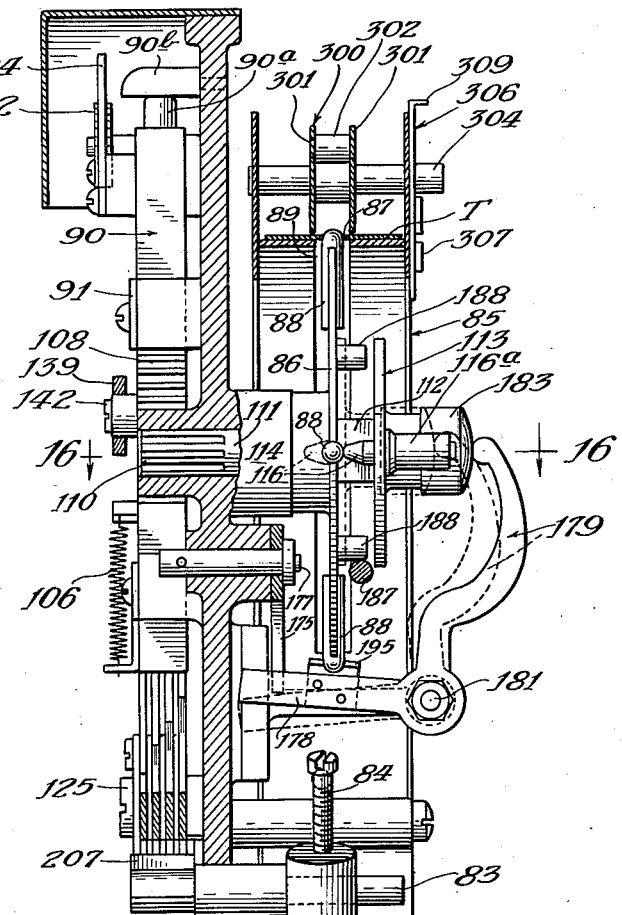

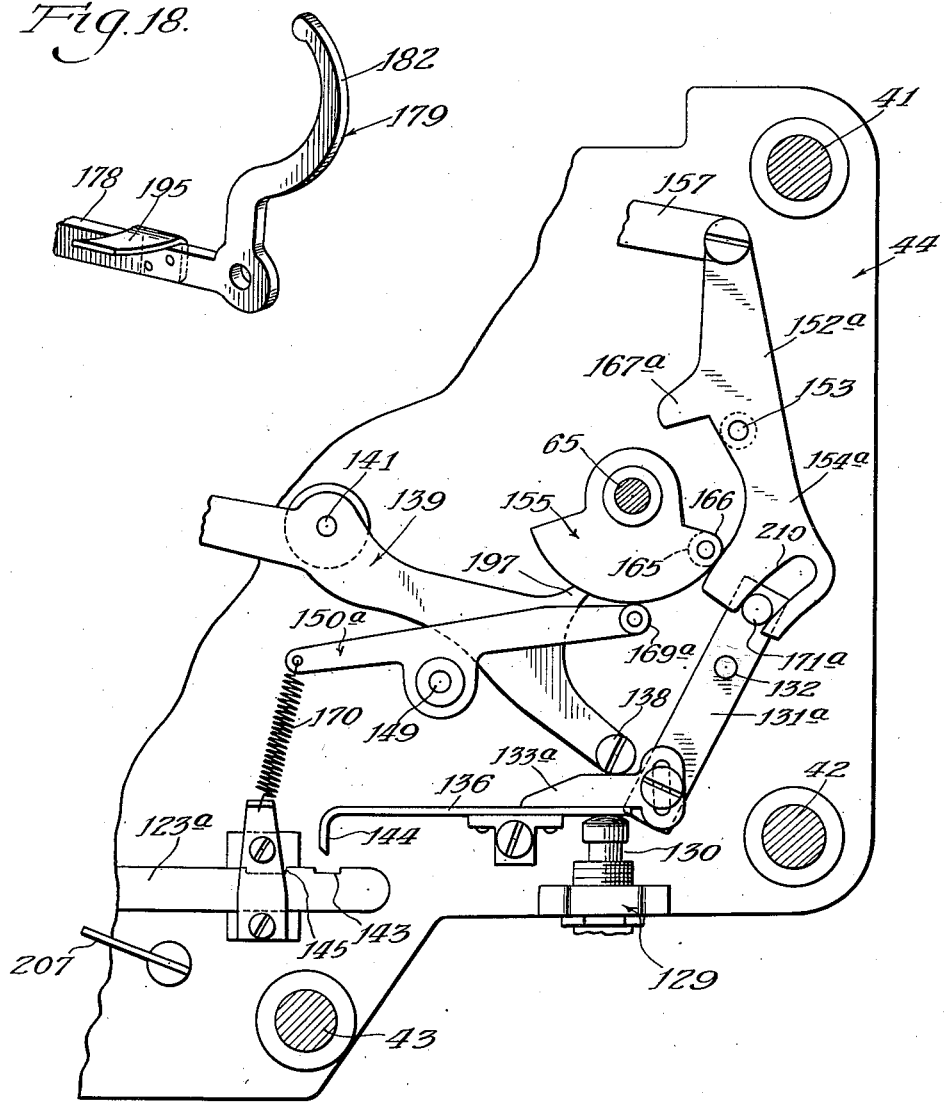

June 8, 1943.　　　　C. DODEGGE　　　　2,321,545
TICKET MACHINE
Filed Feb. 24, 1942　　　11 Sheets-Sheet 11

Inventor:
Carl Dodegge
By Wallace & Cannon
Attorneys.

Patented June 8, 1943

2,321,545

UNITED STATES PATENT OFFICE 2,321,545

TICKET MACHINE

Carl Dodegge, Maywood, Ill., assignor, by mesne assignments, to Aero Metal Products Corporation, Chicago, Ill., a corporation of Illinois Application February 24, 1942, Serial No. 432,165

57 Claims. (Cl. 164—49)

This invention relates to ticket issuing machines and more particularly to that type of ticket issuing machine embodying a plurality of keys and adapted to automatically issue a predetermined number of tickets upon actuation of one of the keys; the number of issued tickets depending upon the key actuated.

Ticket issuing machines of the character involved herein are primarily intended for use in theatres and the like, where it is desirable to use machines which are capable of issuing tickets of various denominations and which will accurately register the number of different tickets so issued.

Therefore, it is an object of my invention to provide a practical and efficient ticket issuing machine embodying a plurality of associated ticket issuing units each of which units is adapted to issue tickets of a given denomination and each of which will accurately register the number of tickets of that denomination which are so issued.

In machines of the aforesaid character inasmuch as single tickets or groups of two or three or more tickets of each denomination will be sold to a customer at different times, it is also desirable that each of the various units be adapted to issue a variable but predetermined number of tickets.

Therefore, it is another object of my invention to provide a ticket machine wherein each unit embodies a plurality of keys whereby the operator or cashier selling tickets may, by actuation of the proper key, cause the machine to issue a predetermined number of tickets from the proper one of the various units.

Another object of my invention is to provide a ticket issuing machine which is driven by an electric motor, and wherein the motor remains stationary except during a ticket issuing cycle of operation.

A further object of my invention is to provide a ticket issuing machine which, upon depression of any one of the keys, will issue the correct corresponding predetermined number of tickets in one cycle of operation.

Another object of my invention is to afford a ticket issuing machine wherein upon completion of a cycle of operation of one of the units, no further tickets can be issued from that unit until and unless the key, which had been previously depressed to initiate the cycle of operation, is released, and has returned to normal position.

A common undesirable feature of ticket issuing machines heretofore known to the art was that in some instances if the operator depressed a key to issue tickets from one unit of the machine and, during the aforesaid operation of the one unit depressed a key on another unit to initiate a ticket issuing operation in the second unit, it would often occur that only a part of the number of tickets which should have been issued from the second unit would actually be issued. Therefore, it is another object of my invention to afford my ticket issuing machine with means whereby from a point early enough in the ticket issuing cycle of operation of any one of the units until the end of that cycle of operation, the other units are effectively locked so that it is impossible to initiate a cycle of operation of any of the other units at such a time during the cycle of operation of the first unit that only a part of the intended number of tickets will be issued.

Another disadvantageous feature common to many of the machines heretofore known to the art is that the internal structure and operating mechanism of the machine is made up of a multitude of moving parts which makes the machine relatively expensive to manufacture and susceptible to numerous mechanical breakdowns or failures. Hence, another object of my invention is to afford a machine embodying relatively simple mechanism which may be economically manufactured and is ruggedly constructed so as to minimize repair and maintenance work on the machine.

Motion picture theatres and like places, for whose use my novel machine is primarily intended, usually endeavor to keep a careful check on the operator or cashier who sells the tickets and, therefore, only allow a very small margin of error in checking on the cash actually taken in and the cash which should have been taken in for the number of tickets sold. One of the methods of checking on the operator, and one which is commonly relied upon for this purpose, is to check the difference in the reading of the counter on each of the ticket issuing units before and after each day's performance against the cash taken in by the operator. It will be apparent that if a unit is allowed to move through a ticket-issuing cycle of operation after the ticket supply has been exhausted, the counter on that unit will register that a greater number of tickets have been issued therefrom than was actually issued. Hence, for the operator's protection and to enable the management to make an accurate check on the number of tickets actually issued, it is desirable that a unit not be allowed to pass through a cycle of operation unless issuable tickets are present in the unit. Therefore, another object of my invention is to afford my novel ticket issuing machine with means whereby each unit will be locked against operation when the issuable ticket supply in that unit becomes exhausted.

Another object of my invention is to afford a ticket issuing machine wherein a unit thereof will become locked against further operation, until more tickets are inserted therein, while there are still a sufficient number of tickets in the machine that the last ticket therein is in readily accessible position so that the first ticket of the newly inserted tickets may be easily and quickly attached thereto.

It has been found that some dishonest cashiers or operators and dishonest ticket takers, who are supposed to collect and destroy the tickets sold to a customer, by acting in collusion have devised means of cheating the management of the theatres in which they work by reselling tickets previously sold and pocketing the cash. One of the ways in which this is worked is for the ticket taker to fail to tear up an occasional ticket and return the same to the cashier. Then when a customer purchases a ticket, the operator or cashier will push the previously sold ticket out to the customer and keep the cash thus taken in and later divide it with the ticket taker. Many moving picture theatre owners and managers know that this is far too prevalent a practice. However, some of the cashiers are very adept at this ticket manipulation, and when the cashiers are allowed to handle the tickets legitimately purchased by a customer it is extremely difficult to detect whether the ticket received by the customer was legitimately issued or was one substituted by the cashier. As a result, most moving picture theatres, wherein ticket issuing machines are used, have a fixed rule that the cashiers are not to handle the tickets purchased by a customer but must allow the customer, himself, to withdraw the ticket or tickets from the opening in the top of the machine and through which the tickets are issued. In most of the modern ticket issuing machines, the tickets so issued have been severed by a knife or knives below the top of the machine and the knife then withdrawn so that further tickets may be issued upon the next operation of the machine. In such instances, the opening or guideway beneath the counter is left open upon completion of a cycle of operation and if a customer, through clumsiness or carelessness, knocks the ticket back down into the machine top, it will fall back into the working parts of the machine from which it must be immediately removed so that it will not be destroyed or jam up the machine. This, naturally, causes a delay in the sale of tickets and is an undesirable feature. Therefore, it is an object of my invention to afford a ticket issuing machine wherein a ticket issuing opening or guideway is closed beneath the lower end of the tickets, which have been issued and severed therefrom, upon completion of a ticket issuing cycle of operation of the machine with respect to a ticket exhaust detector.

Another object of my invention is to afford a ticket issuing machine wherein the ticket severing knife remains in a position covering and closing the opening beneath the lower end of tickets, which have been issued and severed therefrom, upon completion of a cycle of operation; and wherein the knife is not retracted from this position until another ticket issuing cycle of operation has been initiated.

Another object of my invention is to provide a ticket issuing machine wherein a unit thereof cannot be operated if the ticket supply magazine of that unit is not properly positioned within the machine.

A further object of my invention is to afford each of the units of my machine with a novel trigger mechanism which is tripped by depression of a key upon the initiation of a ticket issuing cycle of operation of that unit and which, upon the completion of the cycle of operation, locks the other keys in that unit against depression until the key which was previously depressed has been released.

Another object of my invention is to provide a ticket issuing machine which is driven through ticket issuing cycles of operation by an electric motor and wherein the motor is quickly stopped from overrunning upon completion of a cycle of operation by automatic application of a brake thereto.

Another object of my invention is to afford my novel ticket issuing machine with a novel and practical clutch or indexing mechanism which operates to cause the correct number of tickets to be issued from the machine during a ticket issuing cycle of operation.

A further object of my invention is to provide a ticket issuing machine which is effectively locked at all times against manual operation of the parts to issue tickets without actuation of the counter attached thereto to register the number of tickets so issued.

Other and further objects of the present invention will be apparent from the following description and claims, and are illustrated in the accompanying drawings which, by way of illustration, show preferred embodiments of the present invention and principles thereof and what I now consider to be the best modes in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a front elevational view of a three-unit ticket machine embodying the principles of my novel machine;

Fig. 2 is a left-side elevational view of the machine shown in Fig. 1;

Fig. 3 is a top plan view of the machine shown in Figs. 1 and 2;

Fig. 4 is a front elevational view of the machine shown in Fig. 1 with the front door open to expose the interior of the machine;

Fig. 5 is a sectional view taken substantially on the line 5—5 of Fig. 4;

Fig. 6 is a detail plan view showing the preferred form of ticket severing knife used in my machine;

Fig. 7 is a detail sectional view, taken substantially along the line 7—7 of Fig. 6, showing the ticket severing knife and the trap door through which the tickets are issued;

Fig. 10 is a view, partly in section, of the upper portion of one unit of my machine and is taken substantially on the line 10—10 of Fig. 8 and shows the parts on the rack side of the unit as they appear in their normal position prior to the initiation of a cycle of operation;

Fig. 11 is a detail view illustrating the association of the rack bar and trigger mechanism embodied in my machine;

Fig. 12 is a view similar to Fig. 10 and shows the position of the parts as they would appear after approximately three-quarters of a complete cycle of operation;

Fig. 15 is a sectional view taken substantially on the line 15—15 of Fig. 14;

Fig. 16 is a sectional view through the clutch member or indexing plate and taken substantially on the line 16—16 of Fig. 15;

Fig. 17 is a detail view of the clutch member or indexing plate and is taken substantially on the line 17—17 of Fig. 16;

Fig. 18 is a detail view of the bell crank lever used to actuate the clutch member or indexing plate and shows the stop plate, used in my machine, attached thereto;

Fig. 19 is a view similar to Fig. 10 but showing the rear end portion of a ticket issuing unit of a modified form of my machine, and showing the parts in a position substantially corresponding to the position of the parts shown in Fig. 10;

Figure 8:
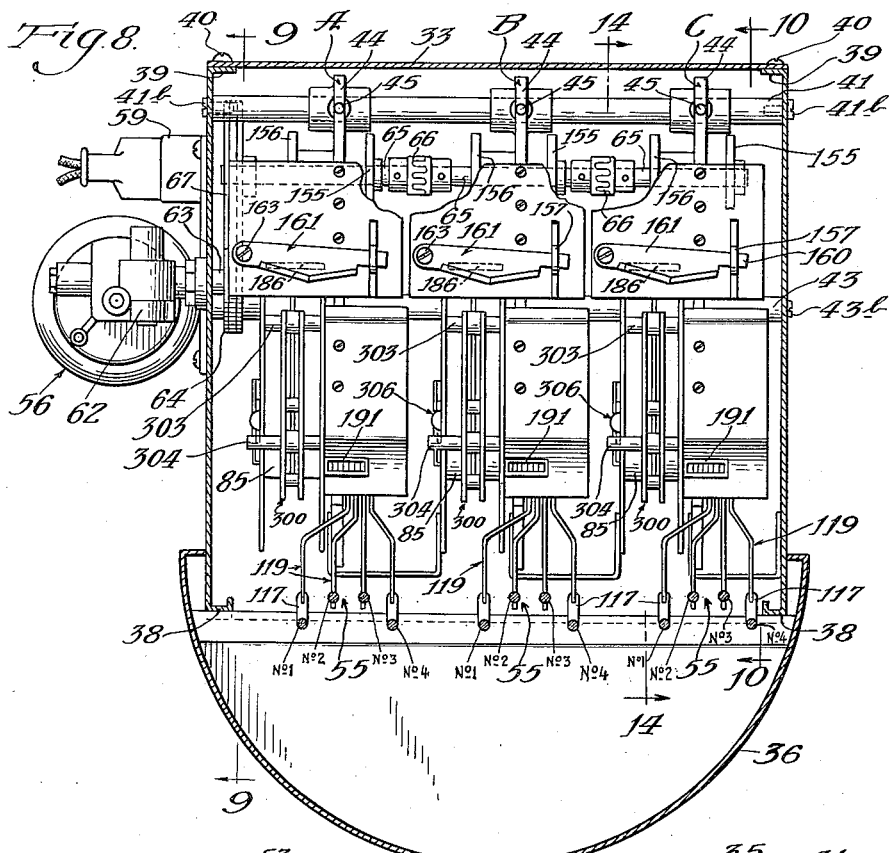
Fig. 8 is a partial sectional plan view taken substantially just below the upper cover of my machine and showing the three units in their relative positions within the casing.

The machine shown in the accompanying drawings embodies a casing 30 which encloses three ticket issuing units A, B and C. The ticket issuing units A, B and C are identical in operation and construction and, therefore, for the purpose of describing my invention, it will only be necessary to describe the operation of one unit thereof, and identical reference numerals will be given to the same parts on the different units. It will be understood that a machine having a greater or lesser number of ticket issuing units may be used without departing from the purview of my invention, and that a three-unit machine is shown here merely for the purpose of illustration.

*General construction of the machine*

The casing 30 has side walls 31 and 32, rear wall 33, front wall or door 34, a cover or top wall 35, a front arm rest 36 and a bottom wall 37. The side walls 31 and 32, having front flanges 38 and rear flanges 39, as best shown in Fig. 8, are positioned on each side of the bottom wall 37 to which they are fastened by means of bolts or screws 37a. The rear wall 33 is secured to the rear flanges 39 of the side walls by suitable fastening means such as screws 40, and the front wall or door 34 is swingingly mounted on the front edge portion of the side wall 31 by hinges 34a.

Figure 9:
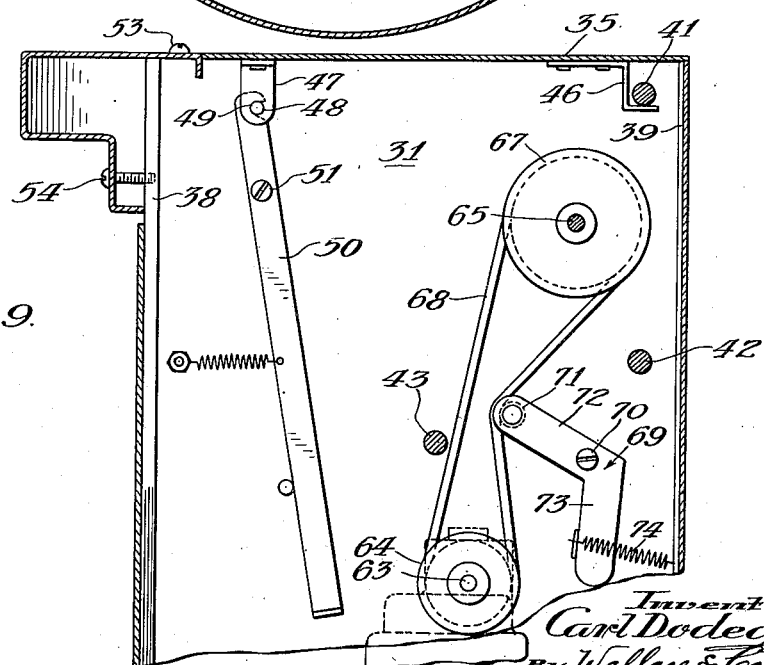
Fig. 9 is a partial sectional view taken substantially on the line 9—9 of Fig. 8.

Supporting rods 41, 42 and 43 extend between the side walls 31 and 32 of the casing 30, as best shown in Figs. 5, 8 and 9, and are mounted thereon by means of screws 41b, 42b and 43b. The units A, B and C each have a supporting plate 44 which comprises the central supporting member for the working parts of that unit, and each of these supporting plates 44 have openings 41a, 42a and 43a through which the supporting rods 41, 42 and 43, respectively, extend to thereby support the units A, B and C. Screws 45 (Fig. 8) are threaded into internally threaded openings formed in the supporting plates 44 adjacent to the openings 41a, 42a and 43 radially thereof and may be securely tightened against the supporting rods 41, 42 and 43 inserted through the openings 41a, 42a and 43a, respectively, to hold the units A, B and C in their proper position upon the supporting rods 41, 42 and 43 and within the casing 30.

The top wall or cover plate 35 has a rearwardly and downwardly extending hook 46 fastened to the rear lower surface thereof and which, when the cover plate is in position on the casing hooks under the supporting rod 41 so as to prevent raising of the rear end portion of the cover plate 35. The lower front end portion of the cover plate 35 has a depending plate 47 fastened thereto; the plate 47 having a pin 48 protruding therefrom which is engageable with a hook 49 on a spring-urged arm 50 which is pivotally mounted on the side wall 31 by means of a screw 51 so that when the cover plate 35 is placed in position on the casing 30, by first engaging the hook 46 with the supporting rod 41 and then lowering the front of the cover plate 35 into position so that the pin 48 is engaged with the hook 49, the cover plate 35 is securely held in position on the casing 30. It will be understood that if and when it is desired to remove the cover plate 35, this may easily be accomplished by turning the spring-urged arm upon its pivot 51 and out of engagement with the pin 48.

The cover plate 35 of the three-unit machine shown in the accompanying drawings has three trap doors one of which is positioned above each of the units A, B and C and through which tickets are issued to a customer during the operation of my machine.

The arm rest 36 is fastened to the top front end portion of my casing by means of screws 53 and 54 and has three sets of four keys 55 protruding upwardly through the rear end portion thereof; one set of keys 55 extends from each of the units A, B and C and protrudes upwardly through the arm rest 36 forwardly of the trap doors 52.

An electric motor 56 is mounted on the left side wall of the casing 30 and has a brake 57 operated by relay 58 associated therewith for purposes which will be presently described. Electrical sockets 59, 60 and 61 are connected to the motor 56 and provide means by which units A, B and C, respectively, may be electrically connected to the motor 56. Reduction gears (not shown) are enclosed within a housing 62 on top of the motor 56 and a drive shaft 63 extends inwardly therefrom through the side wall 31 and has a drive pulley 64 pinned or otherwise secured to the inner end portion thereof, as best shown in Fig. 9, and the drive shaft 63 and pulley 64 afford driving means for each of the units A, B and C as will be presently described.

As best shown in Fig. 8, the units A, B and C have drive shafts 65 which are coupled together by means of couplings 66 after the units have been inserted in proper position in the machine. The drive shaft 65 on the unit nearest to the motor 56 has a pulley 67 pinned or otherwise secured to the outer end portion thereof in radial alignment with the drive pulley 64. A belt 68 is positioned around the drive pulley 64 and the driven pulley 67 and thereby operatively connects the drive shafts 65 of the units A, B and C to the shaft 63 and, thereby, to the motor 56. A bell crank lever 69 is pivoted to the side wall 31 of the casing 30 by means of a screw 70. A roller 71 is mounted on the outer end portion of one arm 72 of the bell crank lever 69, and is urged forwardly by a spring 74, which acts on the other arm 73 of the bell crank lever 69, into engagement with the belt 68 and thereby maintains the pulley belt 68 properly tensioned upon the pulleys 64 and 67.

As best seen in Figs. 4 and 5, each of the units A, B and C includes a ticket magazine 75 which is adapted to hold a supply of folded tickets T. Each of the ticket magazines 75 is open at the front but has side walls 78 and 78a, a rear wall 78b and a channel-shaped bottom end portion 76 adapted to engage and slide upon a complementary trackway 77 formed in the bottom wall 37 of the casing 30 below each of the units A, B and C. The side wall 78 of each of the magazines 75 has rollers 79 and 80 attached thereto for reasons which will be presently described and has a forked extension 81 attached to the upper end portion thereof and which is slidably engageable with the lower end portion of the corresponding supporting plate 44 in each of the units A, B and C. By this construction any of the magazines 75 may be slid forwardly on the track 77 to project outwardly from the casing 30 when it is desired to place a new supply of tickets therein, and are held in proper vertical position upon the track 77 by means of the arm 81 which maintains its engagement with the lower edge portion of the supporting plate 44 of the particular unit with which the magazine 75, which has been slid forwardly, is associated.

Figure 14:
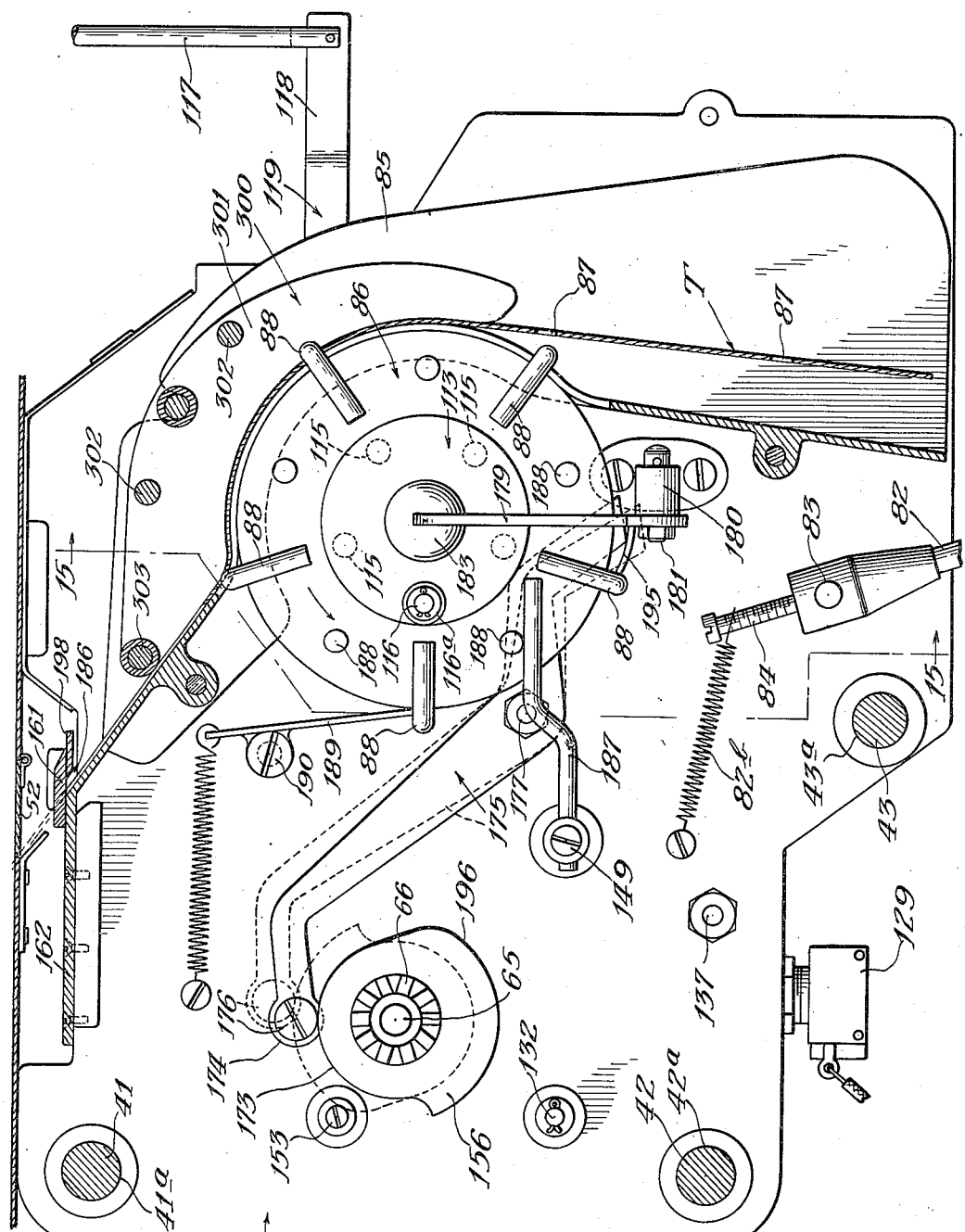
Fig. 14 is a view, partly in section, taken substantially along the line 14—14 of Fig. 8 and showing the parts on the reel side of a unit in full line as they would appear prior to the actuation of the clutch member or indexing plate, and in dotted lines as they would appear after actuation or engagement of the clutch member or indexing plate.

As heretofore stated, when tickets are to be inserted in the magazines 75, door 34 of the casing 30 may be opened and the magazines 75 slide forwardly out of the casing 30. A new supply of folded tickets T may then be placed in the magazine 75 and the leading end portion of the new supply of tickets T is then threaded to the rear of the rollers 79 and 80 and forwardly of a lever 82 which is pivoted to and depends from the supporting plate 44 of that unit by means of a shaft 83 to which it is secured by a screw 84. (The purpose and operation of the lever 82 will be presently described.) The leading end of the tickets T are then threaded upwardly into the shield 85 as best shown in Figs. 5, 14 and 15, and over a reel or ticket issuing wheel 86, below a guard 300, which maintains the ticket strip T in engagement with the shield 85 over the reel 86, as will be presently described. The strips of tickets T commonly used in machines of this character have holes or openings 87, as best seen in Fig. 4, between each pair of tickets and the reel 86 has pins 88 extending from the periphery thereof which are so spaced therearound that consecutive pins 88 on the reel 86 are adapted to engage holes 87 between correspondingly consecutive pairs of tickets positioned upon the shield 85 outwardly of the reel 86. As best shown in Fig. 15, the shield 85 has a slot 89 provided therein through which the pins 88 on the reel 86 protrude so as to engage the tickets T which are threaded over the shield 85, and in the operation of my machine, it is the advancement of a predetermined proper number of pins 88 upwardly through the slot 89, by controlling the rotation of the reel 86, which effects the issuance of a predetermined number of tickets, as will be presently described. As best shown in Figs. 5 and 14, during a ticket issuing operation of my machine, the tickets to be issued are pushed upwardly over the upper end portion of the shield 85 by the pins 88 on the reel 86 and outwardly through the slot 186 and the trap door 52, where they may be grasped and withdrawn by the customer after being severed from the tickets remaining in the machine by a knife 161.

The guard 300 (as best shown in Figs. 4, 5, 8, 14 and 15) acts, as previously stated, to maintain the ticket strip T in engagement with the shield 86 over the slot 89 therein to insure that the pins 88 on the reel 86 which protrude through the slot 89 will engage the holes 87 on the ticket strip T.

The guard 300 consists of two strips or plates 301, which are secured to each other in spaced relationship by spacing members 302 and are curved to fit around the shield 85 and the reel 86 in close relationship thereto at that portion of the shield 85 which curves over the reel 86, as best shown in Fig. 14. The guard 300 is pivotally mounted on the shield 85 by a pin or screw 303, which extends through the upper rear end portion of the plates 301, so that when tickets are being inserted in my machine, over the shield 85, the guard 300 may be swung or pivoted upwardly out of the way to expedite the insertion of the ticket strip T between it and the shield 85.

A pin 304 extends outwardly from the plates 301 of the guard 300, as best shown in Fig. 5, and when the guard is in its normal lowered position, wherein it maintains the ticket strip T in engagement with the shield 85, a hook 305 on a latch member 306 which is pivotally mounted on the shield 85 by means of a screw 307 and which is urged to rotate in a clockwise direction (as viewed in Fig. 5) by a spring 308, engages the pin 304 and effectively holds the guard 300 in its lowered position over the shield 85 and the ticket issuing reel 86. When it is desired to raise the guard 300, as when, for example, tickets are being inserted in the machine, the operator may press rearwardly on a finger piece or projection 309 formed on the upper end portion of the latch member 306, and thereby rotate the latch member 306 around its pivot 307 and thereby retract the hook 305 from its engagement with the pin 304 and the guard 300 is then free to be turned into raised position about its pivot pin 303.

The casing 30 and the general association of the units A, B and C of my machine having been described, a more detailed description of the construction and operation of the various ticket issuing units will now be made. As has been previously stated, each of the units A, B and C of my machine are identical in construction and operation and, therefore, for a complete understanding of the construction and operation of my machine, it will only be necessary to describe the construction and operation of one of them together with the manner in which the various units are associated.

Description of the ticket issuing units

As best shown in Figs. 10, 11, 12 and 13, a rack or rack bar 90 is slidably mounted for substantially vertical movement in guides or guideways 91 and 92 attached to one side of the supporting plate 44 of each of the units A, B and C. The rack 90 in each of the units A, B and C is also slidably mounted on a rod 90a which is attached to an ear 90b projecting from the supporting plate 44, and which rod depends from the ear 90b into a cavity 90c in the upper end portion on the rack 90. A spring 90d is positioned within the cavity 90c and presses upwardly against the lower end portion of the rod 90a and downwardly against the rack 90 to thereby urge the rod 90 to move downwardly.

The rack 90 may perhaps be termed the principal or basic working part of each of the units of my machine because it is the operation of this member upon which the operation of the ticket issuing units of my machine directly depend, and it is the variation in the movement of the rack 90 which determines the number of tickets which will be issued in a cycle of operation of my machine. This side of the supporting plate 44 upon which the rack 90 is mounted, will be hereinafter referred to as the "rack side" of the unit as distinguished from the side on which the ticket issuing reel 86 is mounted (see Figs. 5 and 14), and which will hereinafter be referred to as the "reel side" of the unit.

In its normal or non-ticket issuing position, the rack 90 is raised to its uppermost limit, as best shown in Fig. 10, and is held in this position by a trigger mechanism 93 which includes an upper trigger 94, a lower trigger 95, a link 96 and a trip lever 97. The link 96 is pivotally mounted on the supporting plate 44 by means of a screw 98 and at its free end carries the upper trigger 94 and the trip lever 97 pivotally mounted thereon by a screw 99. The lower trigger 95 is pivotally mounted on the supporting plate 44 by means of a screw or pin 100 and has a forwardly extending arm 101 which is adapted to engage the link 96 on the under side thereof and has a rearwardly extending tip 101a adapted to engage in a rounded cavity 102, formed in the lower front side of the rack 90, when the rack 90 is in normal or raised position. Also when the rack 90 is in normal or raised position, the free end portion 103 of the upper trigger 94 engages a pin 104 provided in a cavity 105 in the front side of the rack 90, and when so engaged, the link 96 on which the trigger 94 is pivotally mounted, rests upon the upper or pinned end portion of the lower trigger 95 so that the downward or clockwise movement of the trigger 94 and the link 96 is limited thereby, and, hence, this engagement of the trigger 94 with the pin 104 holds the rack 90 in its upward or raised position. A spring 106 has one end secured to the lower end portion of the upper trigger 94 as by means of a pin 107 and has the other end portion thereof fastened to the guideway 92 and thereby tends to maintain the upper trigger 94 in lowered position so as to engage the pin 104 on the rack bar 90.

The rack 90 has teeth 108 formed on the rear side thereof and these teeth are in constant engagement with the teeth 109 on a pinion 110 which is formed on the end portion of a shaft 111 which extends through and is journaled in an opening formed in the supporting plate 44. As best shown in Fig. 16, the shaft 111 extends through the supporting plate 44 from the rack side thereof and protrudes outwardly from the reel side thereof, and the reel or ticket wheel 86 is rotatably mounted on this latter portion of the shaft 111. The reel side end portion of the shaft 111 has an enlarged square portion 112 which, when the shaft 111 is in its normal position in the supporting plate 44, butts against the reel 86 and presses it against a boss 114 which protrudes from the supporting plate 44. Also, slidably mounted on the square enlarged end portion 112 of the shaft 111 is a clutch member or indexing plate 113, as will be more fully described hereinafter.

As best shown in Figs. 14 and 16, the reel 86 has holes 115 extending therethrough which are in radial alignment with the peripheral pins 88. A pin 116 is slidably mounted in a sleeve 116a which is attached to the outer side of the peripheral edge portion of the indexing plate 113, and the pin 116 is urged inwardly by a spring 116b, mounted within the sleeve 116a, so that it normally projects through an opening in the indexing plate 113 and is adapted to engage in any one of the holes 115 in the reel 86, with which it is aligned, when the indexing plate is pressed inwardly during the operation of my machine, as will be presently described. It will be noted that the slidable mounting of the pin 116 is a safety measure so that if it should happen that the reel and indexing plate should get out of alignment so that when the indexing plate is pressed inwardly the pin 116 is not in alignment with the hole 115 in the reel but engages the solid outer face of the reel 86, the pin 116 will move inwardly against the action of the spring 116b and thereby prevent jamming and straining of the parts.

In general, the operation of a unit of my machine consists in allowing the rack 90 to drop a predetermined amount while the indexing plate 113 is disengaged from the reel 86 and thereby rotate the indexing plate 113 in a clockwise direction (as viewed in Fig. 14) so that the pin 116 in the indexing plate 113 is in axial alignment with a predetermined one of the holes 115 in the reel 86; and thereafter press the indexing plate 113 inwardly so as to engage the pin 116 with the hole 115 aligned therewith; and then raise the rack 90 back to its normal or raised position and thereby turn the pinion 110, the indexing plate 113 and the reel 86 the predetermined amount fixed by the distance through which the rack 90 was allowed to drop, so that the pins 88 on the reel 86 and which are in engagement with the tickets T are caused to move through a predetermined circumferential distance, determined by the distance through which the rack 90 and indexing plate 113 must move to return to their normal positions. The controlled movement of the reel 86 thereby advances the proper number of tickets T upwardly through the shield 85 and outwardly through the trap doors 52 in the cover plate 35, as will be more fully described hereinafter.

As I have chosen to illustrate my machine, each unit includes four keys 55 and each of the keys are capable, upon depression thereof, to initiate a cycle of operation of my machine, and controls mechanism which will allow the rack 90 to fall a predetermined distance, and inasmuch as each of the four keys 55 allows the rack 90 to fall a distance different from the distance determined by the other keys in the same unit, it will be understood that these keys provide means for regulating or controlling the travel of the rack 90 and thereby the rotation of the pinion 110 and the indexing plate 113, and thereby affords effective means for controlling the rotation of the ticket reel 86 and the number of tickets issued in any one operation of my machine.

Each of the keys is mounted on a key stem 117 which is pivotally mounted on one arm 118 of a key lever 119, which is pivotally mounted on the supporting plate 44 by a screw 120, and the other arm 121 of which extends downwardly between guide plates 122, which are mounted on the supporting plate 44, and is adapted to engage the front end portion of a corresponding key slide 123 which is horizontally slidably mounted on the supporting plate 44 by means of a guideway 124 and a screw 125 which extends through the guide plates 122 and through a slot 126 in the key slide 123. The key slide 123 has a projection or trip 127 which extends upwardly therefrom and is adapted to engage the lower end portion of the trip lever 97 on the trigger mechanism 93 when the key slide 123 is slid rearwardly and the trigger mechanism 93 is in its normal rack holding position. Rearwardly of the trip 127 on the key slide 123, a lug or stop 128 is provided which projects upwardly therefrom and which is adapted to engage the lower end portion of the rack 90 to stop or check the fall of the rack 90 when the key slide 123 is slid rearwardly and the trip 127 has engaged the lower end portion of the trigger trip 97 to release the rack 90. Therefore, it will be seen that by varying the length of the lugs or stops 128 on the various key slides 123 which are adapted to be slid rearwardly by the depression of the corresponding key 55, and which action initiates a ticket issuing cycle of operation of my machine, as will be presently described, the distance through which the rack 90 can move in a cycle of operation is effectively controlled. For example, if it is desired to issue only one ticket from my machine in a cycle of operation, the No. 1 key 55 is depressed which turns the corresponding lever 119 on its pivot 120 and slides the corresponding key slide 123 rearwardly so that the trip 127 thereon engages the trigger trip 97 on the trigger mechanism 93 and releases the rack 90 so that it falls until in engagement with the stop 128 on the No. 1 key slide, which is the tallest of the stops 128, and when the rack 90 so comes to rest, it will have dropped through a relatively short distance. However, if instead of desiring to issue one ticket it was desired to issue four tickets, the No. 4 key 55 would have been depressed, thereby pivoting the corresponding lever 119 on its pivot point 120 and pressing the corresponding key slide 123 forwardly to release the trigger mechanism 93 and allow the rack 90 to drop, but this time the rack 90 would have dropped until it engaged the stop 128 on the No. 4 key slide, and in this instance would have dropped through a distance approximately four times that which it would have dropped had the No. 1 key been depressed for the issuance of one ticket.

An electric switch 129, which is adapted to make and break the electrical circuit through the motor 56 which is the source of power for my novel machine, is mounted on the lower rear end portion of the supporting plate 44 in each of the units A, B and C, and has switch button 130, manipulation of which controls the opening and closing of the switch contacts. A switch lever 131 is pivotally mounted on the supporting plate 44 by means of a pin 132 and has a wedge tip 133 slidably mounted on the lower end portion thereof by means of a pin and slot connection 134—135. When the parts of the ticket issuing unit are in their normal or non-ticket issuing position, as shown in Fig. 10, the wedge tip 133 is positioned under a roller 138 fastened to the lower rear end portion of a lever 139 by means of a screw 140, and thereby is pressed downwardly upon the rear end portion of a spring lock plate 136, which is pivoted to the supporting plate 44 by means of a screw 137, and the downward pressure on the rear end portion of the spring lock plate 136 raises the forward end portion thereof for a reason which will presently be explained, and also depresses the switch button 130, in which position of the switch button 130, the switch 129 is open so that the electrical circuit through the motor 56 is open and the motor is stopped. The lever 139 is pivotally mounted on the supporting plate 44 by means of a screw or pin 141, and the forward end portion of the lever 139 is forked and engages a roller on a pin or screw 142 extending outwardly from the rack side of the rack 90.

It will be apparent from the foregoing description that when it is desired to issue a certain number of tickets, the operator presses the proper key 55 thereby rocking the corresponding key lever 119 on its pivot 120 which slides the corresponding key slide 123 rearwardly through its guides so that the trip 127 engages and presses the lower end portion of the trigger trip 97 rearwardly, through which action the portion 97a on the trigger trip 97 engages and presses the portion 94a on the upper trigger 94 rearwardly thereby rocking the upper trigger 94 in a counterclockwise direction and releasing the upper end portion 103 thereof from its engagement with the pin 104 in the rack bar 90. The disengagement of the upper trigger 94 from the rack bar 90 allows the rack bar 90 to fall until it comes to rest on the stop 128 which has been positioned thereunder by the rearward movement of the key slide 123. The downward motion of the rack bar 90 cams the lower trigger 95 of the trigger mechanism 93 in a clockwise direction so that the rearwardly extending arm 101 thereof presses upwardly on the lower surface of the link 96 and thereby pivots the link 96 about its pivot point 98 and thereby raises the upper trigger 94 and the trigger trip 97 so that the lower end portion of the trigger trip 97 clears the trip 127 on the key slide 123 (as best shown in Fig. 12). The downward motion of the rack 90 also carries the forked or forward end portion of the lever 139 downwardly therewith and rocks the lever 139 in a counterclockwise direction so that the roller 138 on the lower end portion thereof is raised from engagement with the wedge tip 133 on the switch lever 131 so that the switch button 130 is thereby released and allowed to rise upwardly through the action of a spring (not shown) included in the switch 129 to close the switch 129 and complete the circuit through the motor 56 to thereby initiate a ticket issuing cycle of operation.

Each of the key slides 123, four of which are nested in parallel relation in each unit, has a slot 143 provided in the upper rearward portion thereof which is normally disposed directly below a hook 144 on the forward end portion of the spring locking member 136, as is best shown in Fig. 10. A second slot 145 is provided in the upper edge portion of each of the key slides 123, forwardly of the slots 143, and when a key 55 is depressed and a corresponding key slide 123 is slid rearwardly to initiate a cycle of operation of my machine, the slot 145 therein is in alignment with the slots 143 in the other or unactuated key slides in that unit, and when the lever 139 rotates in a counterclockwise direction to release the wedge tip 133 and the switch button 130, it also frees the spring lock lever 136 to rotate around its pivot point 137 and thereby press the hook 144 into engagement with the slots 143 in the key slides 123 which have remained stationary and also into engagement with the aligned slot 145 on the actuated key slide 123 and thereby effectively locks the key slides 123 in that unit which are not actuated so that the corresponding keys thereof cannot be depressed, and holds the key slide 123 which has been actuated in the rearward position to which it has been moved.

A slot 146 is also provided in the upper surface of each of the key slides 123, forwardly of the slots 145, and is adapted to cooperate with a hook 147 on a lever 148, which is pivoted on the supporting plate 144 by means of a pin 149 and which has an arm 150 pivotally mounted on the other end portion thereof by means of a screw 151, as will be more fully described hereinafter.

A cam lever or knife actuating lever 152 is pivotally mounted on the rack side of the supporting plate 144 by means of a screw 153, and the lower end portion 154 thereof is adapted to engage a cam 155 which is mounted on the drive shaft 65 on the rack side of the supporting plate 44 and which will hereinafter be termed the "rack cam" to differentiate it from the cam 156 which is fastened to the drive shaft 65 on the reel side of the supporting plate 44 and which will hereinafter be called the "reel cam." The rear end portion of a link 157 is pivotally mounted by means of a screw 158 to the upper end portion of the knife actuating lever 152, and the front end portion of the link 157 has a slot 159 formed therein which is engaged with an end portion 160 on the knife blade 161 (as best seen in Figs. 6 and 10), and is adapted to pivot the knife blade 161 about its other end portion which is pivotally connected to a plate 162 by means of a screw 163 and which plate is fastened to the upper edge portion of the supporting plate 44 by means of screws 164.

When the mechanism of the ticket issuing unit is in its normal non-issuing position, the knife 161 in each of the units A, B and C is in its forward position as best shown in Fig. 10, and upon depression of a key 55 and the consequent lowering of the rack 90 and counterclockwise rotation of the lever 139 to close the switch 129 in the actuated unit, the drive shaft 65 is consequently driven by the motor 56, which turns the cam 155 in each of the units A, B and C, in a counterclockwise direction (as viewed in Fig. 10) and a pin 165 mounted on the leading tip 166 thereof engages a tip or projection 167 which extends forwardly from the knife actuating lever 152 and thereby causes the knife actuating lever 152 to pivot about its pivot point 153 in a clockwise direction, thus moving the link 157 in a rearward direction and retracting the knife blade 161 in each of the units A, B and C. In the preferred form of my invention illustrated in Figs. 1 to 18, inclusive, the rear tip 168 of the rack cam 155 in each of the units A, B and C, simultaneously with the engagement of the pin 166 with the tip 167 on the knife actuating lever 152, clears a roller 169 which is mounted on the rear end portion of the arm 150, which is pivoted to the locking lever 148, and the tension of a spring 170 which is fastened to the forward end portion of the arm 159, causes the arm 150 to pivot in a counterclockwise direction around its pivot point 151 on the locking lever 148 and, because the forward end portion of the arm 150 engages the locking lever 148, rocks the hook 147 on the forward end portion of the locking lever 148 downwardly into engagement with the key slides 123. However, because one of the key slides 123 of the unit which has been actuated has been displaced rearwardly from its normal position, the slot 146 therein is moved out of alignment with the slots 146 in the other key slides 123 in that unit and the hook 147 cannot engage with the slots therein but comes to rest upon the upper edge surface on the actuated key slide 123. However, inasmuch as the cams on all of the units A, B and C rotate with their drive shafts 65 upon closing of a switch 129 in any one of the units A, B and C, the rear tip or trailing tip 168 on the cams 155 in the other units have also cleared the arms 150 on the locking levers 148 thereof, and the locking levers 148 in these other or non-actuated units have likewise been rotated in a counterclockwise direction and the hooks 147 in these units engage in the slots 146 which, inasmuch as the key slides 123 in these units have not been actuated, are still in alignment with each other. Therefore, it will be noted that the key slides 123 in the other or non-actuated units are effectively held by the hooks 147 against actuation so that shortly after the start of a cycle of operation, none of the keys 55 in the other or non-actuated units in my machine can be depressed to initiate a ticket issuing cycle of operation in these units.

A spring 172, in each of the units A, B and C, is fastened to the rear end portion of the supporting plate 44 and to the lower end portion of the switch lever 131 and constantly urges the latter to rotate in a counterclockwise direction around its pivot 132. However, when a unit of my machine is in its normal, unactuated position, the rear or lower end portion of the knife actuating lever 152 therein, is engaged with a pin 171 attached to the upper end portion of the switch lever 131, as best shown in Fig. 10, and this engagement of the pin 171 with the lower end portion of the knife actuating lever 152 effectively restrains the switch lever 131 from the counterclockwise rotation through which the spring 172 fastened on the lower end portion thereof urges it. But, upon initiation of a cycle of operation, when the cam 155 rotates the knife actuating lever 152 in a clockwise direction, as previously set forth, the lower end portion of the lever 152 is moved away from the pin 171 on the switch 131 and, upon thus being freed, the switch lever 131 is rotated in a counterclockwise direction by the spring 172 and hence the wedge tip 133 thereof is withdrawn from over the switch button 130, for a reason which will be presently described.

While the rack cam 155, in each of the units A, B and C, has been turning with the drive shafts 65 into engagement with the tip 167 on the knife actuating lever 152, and while the roller 166 on the cam 155 has been engaged with the tip 167 and rotating the knife actuating lever 152 in a clockwise direction, the substantially circular-shaped inner cam surface 173 of the reel cam 156, of each of the units A, B and C (as best shown in Fig. 14), has been engaged with a roller 174 which is fastened to the rear end portion of a lever 175 by means of a screw 176. The lever 175 is pivotally mounted on the supporting plate 44, on the reel side thereof, by means of a screw 177, and the forward lower end portion thereof is in engagement with the lower arm 178 on a bell crank lever 179 which is pivotally mounted on an arm 180, which is fastened to, and projects outwardly from, the reel side of the supporting plate 44, by means of a pin 181 extending therethrough. The upper end portion of the upper arm 182 of the bell crank lever 179 is in engagement with the hub or knob 183 on the indexing plate 113 so that when the lower arm 178 of the bell crank lever 179 is depressed, the upper arm 182 of the bell crank lever 179 will press the indexing plate 113 inwardly and thereby engage the pin 116 carried thereby with a hole 115 on the reel 86 with which it is axially aligned.

As has been previously stated, the indexing plate 113 is mounted on the square, reel side end portion of the shaft 111 and a spring 184 is mounted in a cavity 185 formed in the reel end portion of the shaft 111 and presses outwardly on the hub 183 of the indexing plate 113, and thereby urges the indexing plate 113 out of engagement with the reel 86.

When the tickets T are properly threaded in my machine, they extend upwardly through the shield 85 over the reel 86 and upwardly into a slot 186 in the knife supporting plate 162 which is fast to the upper edge portion of the supporting plate 44. Prior to the initiation of a ticket issuing cycle of operation, the leading edge of the ticket strip T butts against the lower surface of the knife 161 which, as previously stated, is normally in a forward position and when so positioned covers the slot 186. This, it will be seen, is a desirable feature of my machine, in that tickets which are issued through the trap door 52 are supposed to be removed therefrom only by the customer purchasing the same and are not supposed to be handled by the operator of the machine and in some instances a customer, through clumsiness or carelessness, might perhaps fail to grasp the ticket and jam it down through the trap door 52 in the cover plate 32 of the casing 30, and if the knife 161 were not positioned over the slot 186 could jam it down onto the ticket strip T over the reel 86 where it would be somewhat difficult to remove and would delay the operator in issuing further tickets. With the knife 161 covering the slot 186 through which the tickets issue, as provided in my machine, it is difficult, if not impossible, to accidentally push a ticket back through the trap door 52, because the knife 161 is positioned so close to the trap door 52 that the ticket must be bent sharply at its middle in order for the upper end portion of the ticket to be pressed below the cover plate 32 of my machine. However, even if a customer does manage to push an issued ticket back through the trap door 52, the ticket would be lying on the knife supporting plate 162 and it could be easily and quickly recovered by the operator by simply raising the cover plate 32 of the machine.

In order to hold the reel 86 against accidental rotation, a holding arm 187 is secured to the reel side end portion of the pin 149 which rotates with the locking lever 148 when the rear tip 168 of the rack cam 155 clears the rear end portion of the arm 150, as previously described, and turns downwardly or in a clockwise direction, as viewed in Fig. 14, out of engagement with a pin 188 which protrudes outwardly from the outer side surface of the reel 86, and with which it is normally engaged. When the holding lever 187 is normally engaged with any one of the pins 188 on the reel 186, it tends to restrain the reel 86 from clockwise or ticket issuing rotation and also presses the reel 86 in a counterclockwise direction until one of the pins 88 on the periphery of the reel 86 engages a spring plate 189 which is mounted on the reel side of the supporting plate 144 by means of a screw 190, so that the holding lever 187 normally acts both to hold the reel 86 from rotation and also to properly position the reel 86. However, as previously stated, substantially simultaneously with the retraction of the knife blade 161 the locking lever 148 is dropped into engagement with the key slides 123 and thereby rotates the screw 149 so that the holding lever 187 is rotated out of engagement with the pin 188 on the reel 86, and therefore, if this were the only holding mechanism for the reel 86, the reel could be manually turned in a counterclockwise or ticket issuing direction and as a result tickets might be issued therefrom without actuation of the rack 90.

Inasmuch as the counting mechanism 191 which tabulates the number of tickets issued consists of the standard counter having a ratchet wheel 192 and which is engaged with teeth 193 on a rack plate 194 which is secured to the upper end portion of the rack 90 and which is geared to tabulate the number of tickets issued in accordance with the distance through which the rack 90 falls upon the initiation of a ticket issuing cycle of operation, it is seen that if the holding arm 187 were relied upon entirely to restrain the ticket reel from being manually turned, that there would be an interval of time between the time when the holding arm 187 were rotated until the time the indexing plate 113 is engaged with the reel 86, that the reel 86 could be manually turned. Therefore, a stop plate 195 is provided on the upper surface of the lower arm 178 of the bell crank lever 179 which extends toward the rear of the machine and, when the bell crank lever is in its normal position, engages one of the peripheral pins 88 on the reel 86 and acts as a check against counterclockwise rotation of the reel 86. The stop plate 195 is so shaped that it maintains engagement with the peripheral pin 88 on the reel 86 until the bell crank lever has been rotated sufficiently to engage the pin 116 on the indexing plate 113 with the hole 115 in the reel 86, and therefore, it will be apparent that it acts as a double check to insure that there will be no point in the operation of the machine wherein the reel 86 alone may be manually rotated.

As previously stated, during the first portion of the ticket issuing cycle of operation of a unit of my machine, and up until the time the cam 155 has actuated the knife actuating lever 152 to retract the knife 162, the roller 174 on the lever 175 is in engagement with the substantially circular-shaped inner cam surface 173 of the reel cam 156. However, shortly thereafter the further rotation of the drive shaft 65 brings the raised portion 196 of the cam 156 into engagement with the roller 174 on the lever 175, and raises the roller 174 which causes the lever 175 to be rotated in a clockwise direction, as viewed in Fig. 14, whereby the lower end portion of the lever 175 is lowered and depresses the lower arm 178 of the bell crank lever 179, causing the upper arm 182 of the bell crank lever 179 to move inwardly and press the indexing plate 113 inwardly toward the reel 86, against the action of the spring 184, and thereby press the pin 116 carried by the indexing plate 113 into engagement with one of the holes 115 in the reel 86, so that upon counterclockwise rotation of the indexing plate 113 the reel 86 will now be likewise rotated and will advance tickets T upwardly through the trap door 52.

Upon continued rotation of the drive shaft 65, during which time the roller 174 is now in engagement with the substantially circular-shaped outer cam surface 196 on the reel cam 156, the rack cam 155 is turned so that the pin 165 on the leading tip 166 thereof engages a projection 197 on the upper rear end portion of the lever 139 (as best shown in Fig. 12) on the ticket issuing unit which has been actuated, and cams the rear end portion of the lever 139 thereof downwardly so as to rotate the lever 139 in clockwise direction, and thereby elevates the rack 90 into its normal raised position where the spring 106 acts on the trigger mechanism 93 to again engage the upper trigger 94 with the pin 104 and press the lower trigger 95 into the cavity or depression 102 formed in the rack 90 to thereby hold the rack 90 in its normal or raised position. Inasmuch as the keys of the other units of my machine have not been depressed the racks 90 thereof have not dropped and, therefore, the levers 139 in these units are in their normal positions so that the rollers 165 on the corresponding cams 155 do not engage the projections 197 on the levers 139 of these unactuated units.

As previously set forth, the rack teeth 108 on the rack bars 90 are in constant engagement with the teeth 109 on the pinion 110 and the downward movement of the rack 90 in the one unit of my machine, following the depression of one of the keys 55 of that unit, which initiated the ticket-issuing cycle of operation of my machine, caused the indexing plate 113 of that unit to be turned in a clockwise direction (as seen in Fig. 14) so that the pin 116 thereon was moved into alignment with the hole 115 in the reel 86 with which it was subsequently engaged upon inward movement of the indexing plate 113 caused by the rotation of the lever 175 in a clockwise direction by the action of the reel cam 156, and the consequent rotation of the bell crank lever 179; all of which operations have been previously described. Similarly now at this point in the operation of my machine, when the roller 165 on the rack cam 155 engages the projection 197 on the lever 139 and rotates the lever 139 in a clockwise direction (as viewed in Fig. 12), the rack teeth 108 on the rack 90 are in engagement with the teeth 109 on the pinion 110 and, therefore, the reverse or upward movement of the rack 90 into normal position caused by the rotation of the lever 139, as previously described, causes the indexing plate 113 to turn in a counterclockwise direction (as viewed in Fig. 14). However, this time the pin 116 on the indexing plate 113 causes a like rotation of the reel 86 and thereby advances the ticket strip T upwardly through the slot 186 and the trap door 52 to issue the proper predetermined number of tickets as determined by the length of the stroke of the rack 90 and the consequent rotation of the indexing plate 113 and the reel 86, which in turn is determined by which key was depressed and therefore which stop 128 was positioned below the rack 90 to limit the fall thereof. Also, during the upward movement of the rack 90, the rack teeth 193 on the rack plate 194 attached to the upper end portion thereof are engaged with the teeth on the ratchet wheel 192 of the counter 191 and cause the wheel 192 to rotate in a reverse direction, in which direction the ratchet mechanism renders the counter inoperative and therefore the wheel 192 is rotated without changing the reading on the counter 191.

The clockwise rotation of the lever 139 of the actuated unit, effected by the engagement of the roller 165 on the cam 155 with the abutment 197 on the lever 139, caused the lower end portion of the lever 139 and hence the roller 138 thereon, to again be lowered directly over the switch button 130 on the switch 129, but because the switch lever 131 and the wedge tip 133 have been retracted by the action of the spring 172, the roller 138 does not engage the wedge tip 133 and therefore does not depress the switch button 130 to open the switch 129 and deenergize the motor 56.

Upon continued rotation of the drive shafts 65, and, therefore, of the rack cam 155 and the reel cam 156 of each of the units A, B and C, the leading tip 166 of each of the rack cams 155 engages the roller 169 on the corresponding arm 150 and causes the arm 150 and the lock lever 148, and therefore the pin 149 and the holding lever 187 to rotate in a clockwise direction (as viewed in Fig. 10) whereby the hook 147 on the lock lever 148 in each of the units A, B and C is disengaged from the slots 146 in the key slides 123 of the units which have not been actuated, and the holding lever 187 is again moved up into engagement with a pin 188 on the reel 86 to hold the reel 86 against rotation.

Upon further rotation of the shaft 65 and therefore of the rack cam 155 and the reel cam 156 and substantially simultaneously with the engagement of the roller 165 on the leading tip of the rack cam 155 with the lower end portion of the knife actuating lever 152, and the reel cam 156 turns to such a position that the raised cam surface 196 thereon has moved out of registration with the roller 174 on the lever 175 so that the roller 174 is free to again move into engagement with the inner cam surface 173 on the reel cam 156. The lever 175 being so freed for counterclockwise rotation (as viewed in Fig. 14), the spring 184 acting on the hub 183 of the indexing plate 113 moves the indexing plate 113 away from the reel 86, and therefore the pin 116 out of engagement with the holes 115 in the reel 186, and thereby rocks the bell crank lever 179 to raise the lower arm 178 thereof so that the stop plate 195 thereon again engages an adjacent peripheral pin 88 on the reel 86, and so that the lever 175 rotates in a counterclockwise direction to engage the roller 174 thereon with the inner cam surface 173 on the reel cam 156, with which surface it remains engaged throughout the rest of the cycle of operation.

Figure 13:
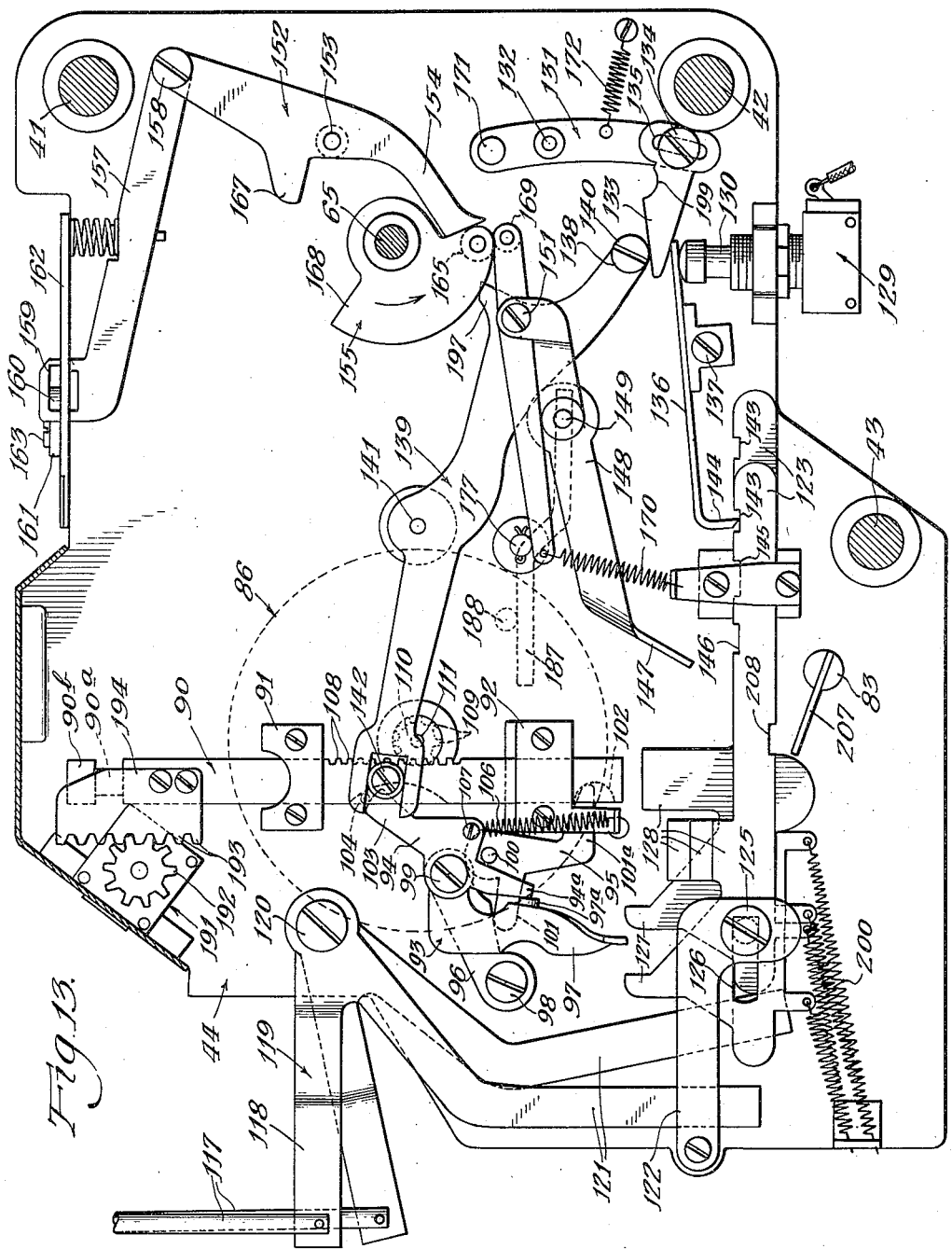
Fig. 13 is a view similar to Figs. 10 and 12 and shows the parts as they would appear just prior to the completion of a cycle of operation and just prior to actuation of the ticket severing knife in a ticket severing direction.

As previously stated, the pin 165 on the leading tip 166 of the rack cams 155 of each of the units A, B and C engaged the lower end portion 154 of the knife actuating lever 152 of the corresponding unit almost simultaneously with the disengagement of the indexing plate 113 from the reel 86 in the actuated unit, and upon further rotation of the shafts 65 and the rack cams 155, the rollers 165 press against the lower end portion 154 of the corresponding knife actuating levers 152 to rotate each of the knife actuating levers 152 in a clockwise direction (as viewed in Fig. 13). The clockwise rotation of each of the levers 152 actuates the knife 161 in each of the units A, B and C and causes it to move across the opening 186 so that in the actuated unit from which a ticket or tickets have been issued, the knife 161 acting in cooperation with a stationary knife blade 198, which is an integral part of the knife supporting plate 162, severs the tickets, which have been issued through the opening 186, from the ticket strip T, as best shown in Figs. 6 and 14, while the knives 161 in the unactuated units make a similar but idle forward rotation. Also upon the clockwise rotation of the knife actuating lever 152 in the actuated unit, the lower end portion thereof engages the pin 171 on the switch lever 131, causing the switch lever 131 to be rotated in a clockwise direction against the action of the spring 172 and thereby presses the wedge tip 133 between the roller 138 on the lever 139 and the rear end portion of the spring lever 136, into a semi-locked position wherein the depression 199 in the wedge tip 133 engages the roller 138. This action of the wedge tip 133 in the actuated unit, wherein it depresses the rear end portion of the spring lever 136, raises the hook 144 on the spring lever 136 out of engagement with the grooves 143 in the key slides 123 which have not been actuated in that unit, and also out of engagement with the groove 145 in the key slide 123 which has been actuated to thereby free the unactuated key slides, so that they may now be actuated by the depression of the proper key 55, and also to free the key slide 123, which has been actuated, to the action of a spring 200 which is attached thereto and which tends to move the key slides in a forward direction, so that the actuated key slide 123 is again restored to normal position whereby it too may again be actuated by the depression of the corresponding or proper key 55. In this connection it will be noted that the levers 139 in the unactuated units have never been actuated during this cycle of operation and, therefore, have held the corresponding switch levers 131 in their original positions, so that the aforementioned counterclockwise rotation of the knife actuating levers 152 of the unactuated units has no effect upon the position of the corresponding switch lever 131, but merely moves the knife actuating levers back into position against pin 171 on the switch lever 131, which has remained stationary during this cycle of operation.

It will be noted that upon raising of the rack 90 and the return of the trigger mechanism to normal position, the trigger trip 97 hangs substantially in a vertical position (Fig. 10) so that the lower end portion thereof is again in position to be engaged by the upper end portion of the trip 127 on any one of the key slides 123. The trigger trip 97 is freely pivoted on the screw 99, so that if the key which was depressed to initiate the cycle of operation of the machine, was maintained depressed during the entire cycle of operation and the trip 127 on the corresponding key slide 123 is, therefore, now behind the trigger trip 97, upon release of the key slide 123 by the spring blade 136 and the consequent retraction of the key slide 123 by the spring 200, the trip 127 engages the trigger trip 97 and pivots it sufficiently in a clockwise direction (as viewed in Fig. 10) so that it can pass thereunder. The screw 98 acts as a stop to limit the clockwise rotation of the trigger trip 97.

In this connection, however, it will be noted that if, upon completion of a ticket-issuing cycle of operation of the machine, a key is still maintained in depressed position, that key must be released and fully returned to normal position before it can be effective to initiate another cycle of operation. Also it will be noted that if the key is not released but is held in depressed position by the operator, it acts as an effective lock against further actuation of that unit by depression of another key of that unit, because if the trigger trip 97 is pressed forwardly by another key slide 123 in that same unit, it will strike against the front edge of the trip 127 on the key slide 123 which is still held in rearward position, so that the trigger trip 97 cannot turn sufficiently to be effective to trip the trigger 94 and release the rack 90. This feature is desirable to prevent the issuance of the wrong number of tickets, which would otherwise be possible, because of the positioning of a wrong stop beneath the rack 90, which was higher than the stop of the key slide which was newly actuated and intended to be effective.

The depression of the rear end portion of the spring lever 136 in the actuated unit by the action of the wedge tip 133 thereon also depresses the switch button 130 to open the switch 129 so that the motor 56 is deenergized. The relay 58 on the brake 57 of the motor 56 (Fig. 2) is also connected in the electrical circuit through the switch 129 to the motor 56 and when energized (that is, when the switch 129 is closed) rotates a lever 201 mounted on a bracket 202 against the action of a spring 203 to disengage a brake block 204 mounted on the front end of the lever 201, from a disc 205 which is secured to the main shaft 206 of the motor to rotate therewith. Therefore, it will be apparent that when the switch 129 is opened and the relay 58 is thereby deenergized, the spring 203 acting on the rear end portion of the lever 201 pivots the lever 201 in its bracket 202 so that the brake block 204 on the forward end portion of the lever 201 frictionally engages the lower surface of the disc 205 and thereby acting through the disc 205 and the main shaft 206 of the motor 56 tends to effectively brake the motor 56. It will be understood that the main shaft 206 on the motor 56 (and therefore the disc 205 attached thereto) acting through the reduction gearing contained in the housing 62, and the pulleys 64 and 67, rotates a relatively large number of times in causing the drive shafts 65 of the various units to make one complete revolution as they do in a cycle of operation of the machine, and, therefore, the brake block 204 need only press relatively lightly against the disc 205 in order to stop the main shaft 206 of the motor 56 almost instantaneously as judged from the amount that the drive shaft 65 and the cams 155 and 156 of the various units are turned during the braking operation.

The description of the construction of the preferred form of my novel ticket issuing machine with a description of the construction of the various parts and their operation having now been made, it is deemed advisable to herein set forth a brief résumé of the operation of my machine and the operation of the parts therein in substantially the order in which the operation thereof occurs during a ticket-issuing cycle of operation of my machine.

In the following description of the operation of my machine, so as to conform to the drawings submitted herewith and wherein for the sake of illustration I have chosen to show the operating parts of my machine as they would appear in issuing one ticket therefrom, I will confine the description to a cycle of operation wherein one ticket is dispensed. However, it will be readily understood that the machine illustrated herein is capable of dispensing 1, 2, 3 or 4 tickets depending upon the key which is depressed in the unit from which the tickets are to be issued, and the principal differences in operation of the machine in issuing 1, 2, 3 or 4 tickets are that different key slides 123 are actuated and, therefore, that the rack 90 in the actuated unit drops a different amount so that it travels through a greater or less distance during a cycle of operation of the machine, depending on the number of tickets to be issued.

Also, it will be understood the machine shown here which will issue one to four tickets, is shown merely to illustrate a practical ticket issuing machine which embodies my invention and I do not wish to be limited thereto, because machines which issue a greater or smaller number of tickets may be made or used without departing from the purview of my invention.

Résumé of the operation

Therefore, assuming that a customer has asked for one ticket, the operator or cashier in charge of the machine presses the No. 1 key on the unit which issues the tickets of the denomination which the customer is entitled to purchase. Upon depression of the No. 1 key, the key lever 119 is rotated about the pivot point 120 to press the corresponding key slide 123 forwardly, and the trip 127 on the key slide 123 engages the lower end portion of the trigger trip 97 and thereby disengages the upper trigger 94 from the pin 104 on the rack 90. The rack 90 drops due to the force of gravity and operation of the spring 90d, and rocks the lower end portion of the lever 139 out of engagement with the wedge tip 133. The release of the wedge tip 133 allows the switch button 130 to rise, thus closing the switch 129, and releases the spring plate 136 in the actuated unit so that the hook 144 thereon engages in the grooves 146 in the unactuated key slides 123 and the groove 145 in the actuated key slide 123 so that they are effectively held in position. The fall of the rack 90 also cammed the lower trigger 95 forwardly and therefore raised the entire trigger mechanism 95 so that the trigger trip 97 is raised above the trip 127 above the key slide 123 so that it hangs in its normal substantially vertical position. Also, the fall of the rack 90 actuated the counter 191, and in the case supposed caused the counter 191 to register the sale of one ticket. In addition, the fall of the rack 90 operating through the engagement of the rack teeth 108 with the teeth 109 on the pinion 110, turned the pinion 110 in a counterclockwise direction (as viewed in Fig. 10) thereby turning the index plate 113 in a clockwise direction (as viewed in Fig. 14) so that the pin 116 on the indexing plate 113 is moved backwardly sufficiently to align with a hole 115 in the reel 86 which is one hole removed, in a clockwise direction, from the normal position of the pin 116.

The closing of the switch 129 actuated the relay 58 to release the brake 57 on the motor 56, and, also, energized the motor 56 and thereby started it running to drive the drive shafts 65 in the units A, B and C of the machine. Upon rotation of the drive shafts 65 the pin 165 on the rack cams 155 in each of the units A, B and C engages the projection 167 on the corresponding knife actuating lever 152 and causes the knife actuating lever acting through the link 157 to return the knife 162 associated therewith, and, also, the rotation of the knife actuating lever 152 of the actuated unit moves it away from or out of engagement with the switch lever 131 so that the spring 172 retracts the wedge tip 133 on the switch lever 131 of that unit.

Substantially simultaneously with the engagement of the roller 165 with the projection 167, the trailing tip 168 of the rack cam 155 in each of the units A, B and C clears the roller 169 on the arm 150 and allows the lock lever 148 to drop into locking engagement with the key slides 123 on the unactuated units to thereby effectively lock these units from actuation during the remainder of the cycle of operation. The rotation of the lock lever 148 also causes the holding lever 187 to rotate out of engagement with the pin 188 on the reel 86.

Next, the leading tip of the raised portion 196 of the reel cam 156 engages the roller 174 on the lever 175 and actuates the lever 175 to rotate the bell crank lever 179 and thereby engage the indexing plate with the ticket reel 86 and move the spring plate 195 out of locking engagement with the pin 88 on the periphery of the reel 86 and with which it was previously engaged.

Next the pin 165 on the leading tip 166 of the rack cam 155 engages the projection 197 on the lever 139 and rotates the lever 139 in a clockwise direction and thereby raises the rack 90 into its normal raised position, in which position the trigger mechanism 93 acting through the upper trigger 94 and lower trigger 95 engages the rack 90 to hold it in raised position. The movement of the rack 90 from its lower to its raised position actuates the pinion 110 and causes it to rotate in a clockwise direction (as viewed in Fig. 10) which causes the indexing plate 113 to be rotated in a counterclockwise direction (as viewed in Fig. 14) and thereby, because the indexing plate is engaged with the ticket reel 86, causes the reel 86 acting through the peripheral pins 88 to advance the ticket strip T the distance of one ticket so that the issued ticket extends through the opening 186 in the knife supporting plate 162 and outwardly through the trap door 52 in the top cover plate 35 in the casing 30, with the lower edge portion of the issued ticket in alignment with the upper surface of the knife supporting plate 162. The raising of the rack 90 has also caused the ratchet wheel 192 to turn through an idle rotation in the counter 191. Also the rotation of the lever 139 has caused the roller 138 on the rear lower end portion thereof to be lowered over the switch 130 in its normal or unactuated position.

Next, the leading tip 166 on each of the rack cams 155 of the units A, B and C engages the roller 169 on the arm 150 and causes the levers 148 to be rotated in a clockwise direction (as viewed in Fig. 10) so as to disengage the hooks 147 on the levers 148 from the grooves 146 in the key slides 123 in the non-actuated ticket issuing units. Also the rotation of the levers 148 causes the holding arms 187 on each of the units A, B and C to again engage the pin 188 on the side of the reel 86 which is positioned directly above the free end portion of the arm 187.

Next, the trailing tip of the raised surface 196 of the reel cam 156 in each of the units A, B and C clears the roller 174 on the corresponding lever 175 so that the roller 174 is free to move downwardly into engagement with the lower cam surface 173 on the cam 156 and thereby frees the lever 175, the bell crank lever 179 and the indexing disc 113 to the action of the spring 184 within the hub 183 of the indexing disc 113. The spring 184 in each of the units A, B and C thereupon presses the corresponding indexing plate 113 out of engagement with the reel 86 in that unit, and thereby rocks each of the bell crank levers 179 to raise the stop plate 195 thereon into engagement with a peripheral pin 88 on the associated ticket reel 86, and to rotate the corresponding lever 175 in a counterclockwise direction so as to engage the roller 174 thereon with the lower cam surface 173 on the reel cam 156 of that unit.

Substantially simultaneously with the disengagement of the indexing plate 113 from the reel 86, the roller 165 on the leading tip 166 of each of the rack cams 155 engages the lower end portion 154 of the corresponding knife actuating lever 152 and, acting through the link 157, causes the knife 161 of the respective units to move forwardly into and through the ticket severing position. The knife 161 of the unit from which the ticket has been issued during this cycle of operation of the machine cooperates with the knife blade 198 on the knife supporting plate 162 to sever the ticket, which has been issued through the opening 186 in the knife supporting plate 162 and through the corresponding trap door 152 in the top wall or cover plate in the casing 30 of the machine. During the ticket severing actuation of the knife 161 in the unit from which a ticket has been issued, the knives 161 in the other two units, from which tickets have not been issued, made the same movement as the knife 161 in the unit which has been actuated, but, of course, inasmuch as no tickets are in position to be severed in these units, the knives 161 merely passed through an idle or non-ticket severing operation.

During the actuation of the knives 161, the rotation of the knife actuating lever 152 in the actuated unit also engages the pin 171 on the switch lever 131 and presses the wedge tip 133 thereon into its semi-locked position with the roller 138 on the lever 139, thereby raising the hook 144 on the spring lever 136 out of engagement with the notches 145 and 143 in the actuated and non-actuated key slides 123, respectively, in the unit which has been actuated, and opens the switch 129 to deenergize the motor 56 and apply the brake 57 thereto, thus ending the ticket issuing cycle of operation of my machine and positioning all the moving parts of my machine in their proper normal stationary positions, where they will remain until another ticket issuing cycle of operations is initiated.

Ticket exhaust detector

In that, as previously stated, it is desirable that a ticket issuing unit of my machine be prevented from running after the ticket supply therein has been exhausted, I desire to provide a locking mechanism which will effectively lock the keys in any ticket issuing unit wherein the ticket supply has been exhausted so that the unit cannot be operated until a new supply of tickets has been placed therein. As best shown in Figs. 4, 5, 10 and 15, this mechanism comprises a lever 82 secured to a rotatable pin 83 which extends through the supporting plate 44 of the ticket issuing unit, and which pin 83 has a latch member 207 secured to the end portion thereof which protrudes from the rack side of the supporting plate 44. When tickets are present in the machine, as previously set forth, the tickets are threaded upwardly behind rollers 79 and 80 which are mounted on the magazine 75 and in front of the lower end portion 82a of the lever 82 which is urged forwardly against the tickets T between the rollers 79 and 80 by the action of a spring 82b, one end of which is secured by the screw 84 to the upper end portion of the lever 82 and the other end of which is attached to the supporting plate 44.

When tickets are so threaded between the rollers 79 and 80 and the lower end portion 82a of the lever 82, the lower end portion 82a of the lever 82 is held back so that the latch member 207 on the pin 83 is maintained in lowered position (as shown in solid lines in Fig. 10). However, if the ticket strip T should become broken or become exhausted so that a ticket is no longer in position between the lever 82 and the rollers 79 and 80, the spring 82b will move the lever 82 in a counterclockwise direction (as viewed in Fig. 5) and will thereby move the latch member 207 into raised position (as best shown in dotted line in Fig. 10) to thereby engage in notches 208 formed in the bottom portion of the key slides 123 in that unit and thereby prevent further actuation of the key slides 123 and, therefore, of the keys 55 in that unit, until the tickets are again inserted between the lever 82 and the rollers 79 and 80 to thereby move the lever 82 into its normal position and the member 207 out of engagement with the notches 208 in the key slide 123.

Usually, new supplies of tickets for machines of this character have a small strip of gummed paper which is attached to and extends from the leading tip of the first ticket of the new supply, so that if a new supply of tickets is inserted in the machine before the old supply is completely exhausted, the front tip of the new supply of tickets may be easily attached to the rear tip of the old supply of tickets already in the machine. Hence, although the lever 82 may be of any desired length, I prefer to use a lever of such length that if the last ticket of the ticket supply were positioned between the lever 82 and the rollers 79 and 80 just as a cycle of operation of the machine is initiated which would issue the maximum number of tickets possible to be issued in one cycle of operation of the machine (in the machine illustrated, this would be four tickets), the end of the ticket strip upon completion of the cycle of operation whereby the entire ticket strip had been advanced upwardly, would be positioned in the lower portion of the shield 85 so that it could easily be reached by the operator to quickly attach the next supply of tickets thereto. In using a lever of this length, it will be noted that if the ticket supply of any unit becomes exhausted while customers are waiting to purchase tickets, the operator may quickly place a new supply of tickets in the empty magazine, thread the leading end portion of the tickets up between the lever 82 and the rollers 79 and 80, and fasten the leading tip of the first ticket of the new supply to the rear tip of the last ticket on the old supply by means of the gummed paper as heretofore explained, without appreciable delay.

Figure 20:
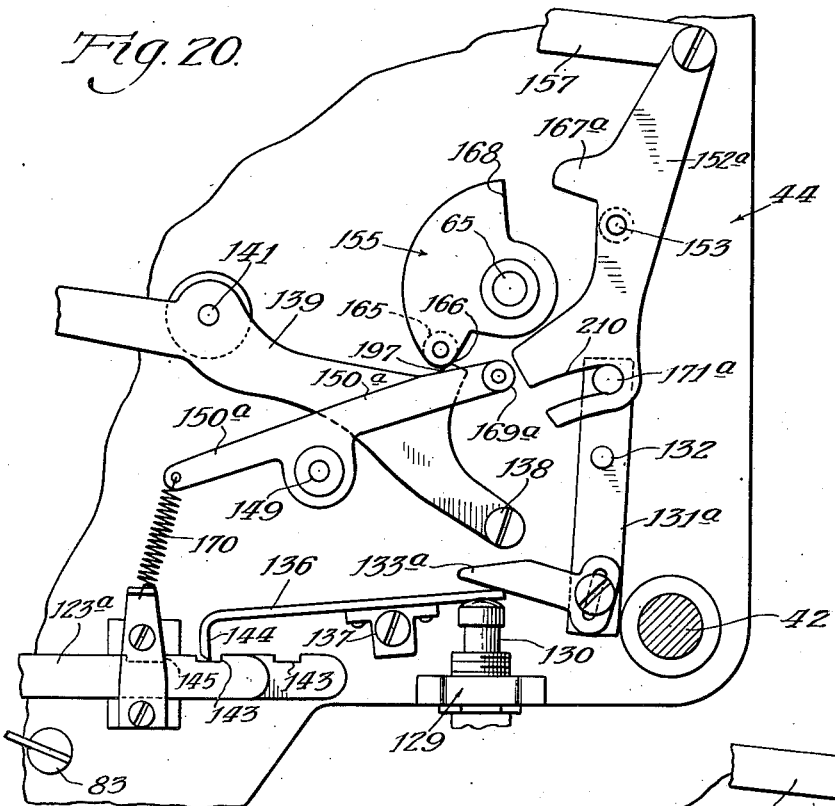
Fig. 20 is a view similar to Fig. 19 and showing the parts in the modified form of my machine in a position substantially corresponding to the position of the parts shown in Fig. 12.
Figure 21:
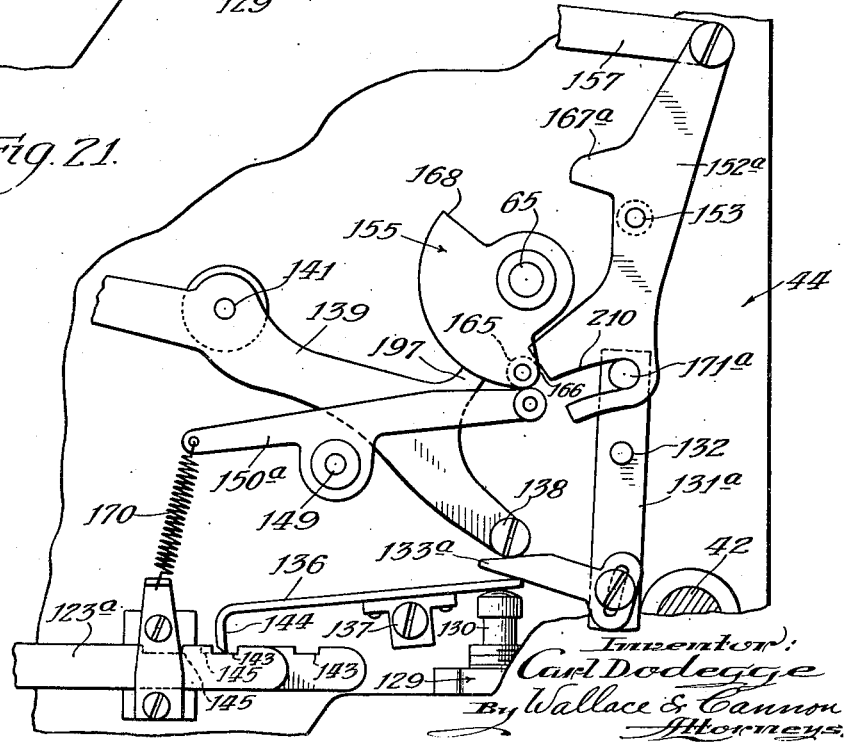
Fig. 21 is a view similar to Fig. 19 and showing the parts in the modified form of my machine in a position substantially corresponding to the position of the parts shown in Fig. 13.

Modified form of machine shown in Figs. 19, 20 and 21

The modified form of my machine which I have shown in Figs. 19, 20 and 21 operates on the same principle as the preferred form of the machine illustrated in Figs. 1 to 18, inclusive, and like reference numerals have been used on like parts and same reference numerals with the suffix *a* have been used on parts which are similar but which have been substituted for parts of the preferred form of my invention. All of the changes made in the modified form of my invention over the preferred form as shown are embodied in the operating mechanism attached to the rear end portion of the supporting plate 44.

It will be noted that the changes made in the modified form of my invention comprise the following: The lever 148 has been done away with in the new form of my invention and the arm 150a which is mounted directly on the pin 149 and which otherwise operates similarly to the arm 150 which was pivotally mounted on the locking lever 148 has been added, the key slides 123a in the modified form of my invention are the same as the key slides 123, except that the forward grooves or notches 146 in the upper edge portion thereof have been omitted in that there is no longer a locking lever 148 to engage therewith. The principal change made in the modified form of my mechanism over the preferred form shown in Figs. 1 to 18, inclusive, consists in doing away with the knife actuating lever 152 and substituting a knife actuating lever 152a which has a slot 210 in the lower end portion thereof which engages the pin 171a on the switch lever 131a which has been substituted for the switch lever 131 and which, for reasons which will be presently explained, need not be spring-urged by a spring 172 such as is fastened to the switch lever 131. Also, the wedge tip 133 has been modified slightly to form a tip 133a which does not have the indentation 199 which was present in the wedge tip 133.

In the operation of the modified form of my machine, as illustrated in Figs. 19, 20 and 21, when the lever 139 is rotated in a counterclockwise direction upon the dropping of the rack 90, the roller 138 thereon is raised and allows the wedge tip 133a in that unit to swing upwardly, as did the wedge tip 133, to release the spring lock lever 136 so that the hook 144 thereon engages in the grooves 143 in the unactuated key slides 123a and the groove 145 in the actuated key slide 123a, as in the other machine. However, upon rotation of the drive shafts 65 and therefore the rack cams 155, when the roller 165 on the leading tip 166 on each of the rack cams 155 engages the projection 167a on the new knife actuating lever 152a, in the respective units, the resulting clockwise rotation of the knife actuating levers 152a positively rotates the new switch levers 131a in a counterclockwise direction through the engagement of the pin 171a on the switch levers 131a with the inner surface of the slot 210 in the respectively knife actuating blades 152a. The counterclockwise rotation of each of the switch levers 131a retracts the attached wedge tip 133a from its position over the switch button 130 on each of the switches 129 in the units A, B and C and thereby, in the units which have not been actuated, allows the switches 129 therein to close and the spring lock levers 136 to engage in the grooves 143 on the key slides 123a and thereby effectively lock the key slides in the unactuated units so that the keys attached thereto may not be operated during the cycle of operation. For this reason it will be apparent that the locking lever 148 used in the preferred form of my machine is unnecessary in the modified form of my machine and may, therefore, be omitted, because the key slides 123a in the unactuated units are now effectively latched by the spring lock levers 136.

As in the case of the preferred form of my invention, simultaneously with the actuation of the knife actuating levers 152a, the trailing tip 168 on each of the rack cams 155 clears the roller 169a on the respective arms 150a so that the arm 150a and the pin 149 in each of the units may be rotated by the action of the spring 170 to thereby rotate the holding lever 187 attached thereto, out of engagement with one of the pins 188 on the reel 86 in that unit, as in the preferred form of my invention.

Also, as in the preferred form of my invention, upon further rotation of the drive shafts 65 and the rack cams 155, the roller 165 on the leading tip 166 of the rack cam 155 of the actuated unit, engages the projection 197 on the lever 139 in that unit and raises the rack 90 associated therewith into its normal raised position and lowers the roller 138 on the lever 139 into its normal unactuated position directly over, and close to, the switch button 130 on the switch 129. Shortly thereafter the leading tip 166 on each of the rack cams 155 engages the roller 169a on the respective arms 150a and rotates the arm 150a in each unit and the pin 149 in a clockwise direction to again raise each of the holding levers 187 into engagement with the corresponding pin 188 on the ticket reel 86 in each of the respective units.

Next, as in the preferred form of my invention, the roller 165 on each of the rack cams 155 engages the lower end portion 154a of the knife actuating lever 152a in each of the units A, B, and C, and through a link 157, causes the knife 161 in each unit to move through a ticket severing operation. The counterclockwise rotation of the knife actuating levers 152a causes each of the switch levers 131a to rotate in a clockwise direction and thereby presses the wedge 133a, associated therewith, between the roller 138 on the lever 139 and the rear end of the spring lock lever 136 and the switch button 130 to thereby release the key slides 123a and open the switch 129, respectively.

Therefore, from the foregoing description of the modified form of my invention and from the drawings presented herewith, it will be noted that the principal change which my modified form embodies over the preferred form of my invention is that one of the parts, namely, the locking lever 148 may be done away with, and the spring 172 may be omitted, and the action between the switch lever 131a and the knife actuating lever 152a is now positive and direct which tends to give a quieter operating machine, and also, the positive operation of all the switch levers 131a upon the operation of any one unit allows the spring lock lever 136 in each unit to be utilized for locking the unoperated units so that the key slides 123a in all the units are positively locked soon after the initiation of a cycle of operation of any of the units and without the use of an extra locking lever, and continue to be so locked until near the completion of the cycle of operation, at which time another key in any of the units may be depressed to initiate a new cycle of operation and at which time it is assured that upon so doing a complete cycle of operation will be effected, in which the proper number of tickets will be issued.

From the foregoing description of the construction and operation of my machine taken in conjunction with the accompanying drawings, it will be apparent that I have provided a novel and practical ticket machine embodying a novel combination of parts which are sturdy in construction and positive in action and which will give long and continuous service without requiring adjustment or repair.

Also, it will be noted that I have provided a ticket issuing machine embodying a novel and practical clutch or indexing means for effecting the issuance of the proper number of tickets from my machine during the operation thereof.

Further, it will be noted that I have provided a ticket issuing machine which keeps an accurate check on the number of tickets issued therefrom and is effectively locked at all times against accidental or manual issuance of tickets by such means as, for example, pulling on a ticket protruding from the machine during the operation thereof, or by manually turning the ticket issuing reel.

Also, it will be noted that I have provided novel means for locking the various units of my machine against actaution by the operator during a ticket issuing cycle of operation of any one of the units.

Also, it will be noted that the present invention accomplishes its intended objects, some of which have been specifically referred to hereinbefore and others of which will be apparent from the foregoing description taken in conjunction with the accompanying drawings.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A ticket issuing machine comprising: a ticket delivery reel; a rotatably mounted indexing plate adapted to engage said reel in various positions; means for rotating said indexing plate from a normal position into a preselected position; means for moving said indexing plate into engagement with said reel, after said indexing plate has been rotated into a preselected position; manually operable means for initiating a ticket issuing cycle of operation of said machine; and means for returning said indexing plate from said preselected position to said normal position and thereby rotate said reel during a ticket issuing cycle of operation of the machine.

2. A ticket issuing machine comprising: a supporting member; a shaft rotatably journaled in said supporting member; a ticket delivery reel rotatably mounted on said shaft; an indexing plate slidably mounted on said shaft for rotation therewith and adapted to drivingly engage said ticket delivery reel during an operation of said machine; means for setting said indexing plate in preselected position; means for engaging said indexing plate with said reel, after said indexing plate has been set in preselected position during said operation of said machine; driving means for rotating said shaft when said indexing plate is engaged with said reel; and manually operable means for limiting the extent of movement of said shaft.

3. A strip ticket issuing machine comprising: a rotary feed member for the strip, having a substantially circular-shaped row of spaced holes provided in the side face thereof; a rotary member having a pin protruding therefrom which is adapted to be selectively engaged with one of said holes; driving mechanism for said rotary member; and manually operable means for selectively controlling the position at which said pin engages in one of said holes depending upon the number of tickets to be issued.

4. A strip ticket issuing machine comprising: a rotary feed member for the strip; a slidably mounted rack having a normal position and an actuated position; means engaging said rack and normally holding said rack in normal position; a spring urging said rack toward actuated position; a pivoted lever having one end engaged with said rack; an electric motor; manually operable means for releasing said holding means to thereby free said rack to the action of said spring; means associated with said manually operable means for controlling the extent of actuation of said rack by said spring; means for energizing said motor upon manipulation of said manually operable means; driving means adapted to turn said lever upon energization of said motor and thereby return said rack to normal position; means connected to said rotary feed member and operatively engaging said rack, said means being operated by the return movement of said rack to thereby revolve said rotary feed member; means for severing issued tickets; and means operative upon completion of a ticket issuing cycle of operation to deenergize said motor.

5. A ticket issuing machine comprising: a rotary feed member for feeding a ticket strip; a motor; an oscillatable member carrying a pin; means for moving said oscillatable member into a predetermined position; means for engaging said pin with said rotary feeding member after said oscillating member has been moved to said predetermined position; means driven by said motor for returning said oscillatable member to its original position and thereby rotate said feed member in a ticket issuing movement.

6. A ticket issuing machine for issuing a predetermined number of tickets and comprising: a rotary feeding member for feeding a ticket strip; a motor; a switch for said motor; an oscillatable member carrying a pin; means for moving said oscillatable member in one direction; manually operable means controlling the extent of movement of said oscillatable member in said one direction; means for closing said switch and thereby energizing said motor upon manipulation of said manually operable means; means driven by said motor for engaging said pin with said rotary feeding member; means driven by said motor to turn said oscillating member in the other direction when said pin is engaged with said rotary feeding member to thereby rotate said feeding member to issue a predetermined number of tickets; and means for opening said switch and stopping said motor upon completion of a ticket issuing cycle of operation of the machine.

7. A ticket strip issuing machine comprising: a rotary feeding member for said strip; an indexing member adapted to drivingly engage said feeding member, said indexing member being normally out of engagement with said rotary feeding member; means for setting said indexing member for engagement with said rotary feeding member in a predetermined position; means for engaging said indexing member with said rotary feeding member; and power operated means operative on said indexing member, after engagement of said indexing member with said rotary member, to return said indexing member to normal position and thereby rotate said feeding member through a ticket issuing movement.

8. A ticket issuing machine for issuing a predetermined number of tickets and comprising: a rotary feeding member for feeding a ticket strip; a motor; a switch for said motor; an oscillatable member carrying a pin; means for moving said oscillatable member in one direction, said means including a reciprocating rack; manually operable means controlling the extent of movement of said rack; means for closing said switch and thereby energizing said motor upon manipulation of said manually operable means; means driven by said motor for engaging said pin with said rotary feeding member; means driven by said motor to turn said oscillating member in the other direction when said pin is engaged with said rotary feeding member to thereby rotate said feeding member to issue a predetermined number of tickets; and means for opening said switch and stopping said motor upon completion of a ticket issuing cycle of operation of the machine.

9. The device defined in claim 7 and in which said setting means includes a spring urged rack bar, a gear connected to said indexing member and in engagement with said rack bar to be rotated thereby upon movement of said rack bar, and manually operable means for selectively limiting the extent of motion of said rack bar; and which device includes means for severing issued tickets from the ticket strip.

10. A ticket issuing machine comprising: a ticket feed reel; driving means; a rotatable member adapted to be set to drivingly engage said reel in various positions; means controlling the setting of said rotatable member; means whereby actuation of the controlling means serves to initiate action of the driving means; means for engaging said rotatable member with said reel; and means driven by said driving means to rotate said rotatable member when said rotatable member is in driving engagement with said reel.

11. A ticket issuing machine comprising: a ticket feed reel; driving means; a rotatable member adapted to be set to drivingly engage said reel in various positions; a plurality of selector keys controlling the setting of said rotatable member; means whereby actuation of one of said selector keys serves to initiate action of the driving means; means for engaging said rotatable member with said reel; and means driven by said driving means to rotate said rotatable member when said member is in driving engagement with said reel.

12. A ticket issuing machine comprising: a ticket feed reel; driving means; a rotatable member adapted to be set to drivingly engage said reel in various positions; means for setting said rotatable member, including a reciprocatory rack; a plurality of selector keys controlling the extent of movement of said rack and thereby controlling the setting of said rotatable member; means whereby actuation of one of said selector keys serves to initiate action of the driving means; means for engaging said rotatable member with said reel; and means driven by said driving means to move said rack in one direction when said rotatable member is in driving engagment with said reel, and thereby rotate said member and said reel.

13. A ticket issuing machine comprising: a ticket feed reel; driving means; a rotatable member adapted to be set to drivingly engage said reel in various positions; means for setting said rotatable member, including a reciprocatory rack; means for engaging said rotatable member with said reel; means for reciprocating said rack, including means driven by said driving means to move said rack in one direction when said rotatable member is in driving engagement with said reel; a plurality of selector keys for controlling the extent of movement of said rack; means whereby actuation of one of said selector keys serves to initiate action of said driving means; means driven by said driving means to sever tickets issued from the machine; and means for stopping said driving means upon completion of a cycle of operation of the machine.

14. A ticket issuing machine comprising: a rotary feed member for feeding a ticket strip; a rotary indexing member; means for engaging said rotary indexing member with said rotary feed member; a motor; means for turning said rotary indexing member in one direction to an extent determined by the number of tickets to be issued, when said rotary members are not engaged; and means driven by said motor for thereafter, in the same cycle of operation, rotating said indexing member in the opposite direction when said members are engaged, to rotate said feeding member and thereby issue a preselected number of tickets from the machine.

15. A ticket issuing machine comprising: a rotary feed member for feeding a ticket strip; a rotary indexing member; means for engaging said rotary indexing member with said rotary feed member; a motor; means for turning said rotary indexing member in one direction to an extent determined by the number of tickets to be issued, when said rotary members are not engaged, said means including a reciprocatory rack, engaged with a gear which is connected to said indexing member; means driven by said motor for thereafter, in the same cycle of operation, rotating said indexing member in the opposite direction when said members are engaged, to rotate said feeding member and thereby issue a preselected number of tickets from the machine; and means driven by said motor to sever the tickets issued from the machine.

16. A ticket issuing machine comprising: a ticket feed reel; a motor; a rotatable member adapted to be set to drivingly engage said reel in various positions; manually operable means for setting said rotatable member in predetermined position; a pivotally mounted lever; a cam driven by said motor to rotate said lever to press said rotatable member into engagement with said reel; and means driven by said driving means to rotate said rotatable member when said member is in driving engagement with said reel.

17. The machine defined in claim 16 and in which said driven means includes a gear connected to said rotatable member to rotate therewith, a reciprocatory rack engaged with said gear, a pivotally mounted lever having one end engaged with said rack, and a cam driven by said motor and adapted to engage said lever to actuate it at a predetermined point in a cycle of operation of the machine, when said member is in engagement with said reel, and thereby move said rack and rotate said reel.

18. A ticket issuing machine comprising a plurality of ticket strip issuing units, and a motor, each of said units comprising: a reel for feeding a ticket strip; a rotary member adapted to be set to engage said reel in various positions;

a plurality of digitally operable members for controlling the setting of said rotary member and initiating a cycle of operation of the machine; means for setting said rotary member upon manipulation of a digitally operable member; means for engaging said rotary member with said reel; means driven by said motor to rotate said rotary member, when said member is engaged with said reel, to thereby rotate said reel in a ticket issuing direction; and means for locking the digitally operable members in each of the units upon initiation of a ticket issuing cycle of operation of any unit.

19. The machine defined in claim 18 and in which the locking means includes a spring urged hook for engaging the digitally operable members in the actuated unit substantially instantaneously with the manipulation of the digitally operable members, and a spring urged lever on each of the other units, moved by the motor into engagement with the digitally operable members in the respective units shortly after initiation of a ticket issuing cycle of operation of the machine.

20. The machine defined in claim 16 and in which said driven means includes a cam driven by said motor, and means driven by said cam for rotating said rotatable member; and which machine includes a knife having a retracted and a normal advanced or ticket severing position; and which machine includes means driven by said cam to retract said knife from advanced position upon initiation of a ticket issuing cycle of operation, before a ticket has been issued from the machine, and to advance said knife into ticket severing position toward the end of the ticket issuing cycle of operation, after the tickets have been issued from the machine.

21. A ticket issuing machine for delivering one or more tickets during a cycle of operation of the machine, and comprising: a reel for feeding a ticket strip; an electric motor; an electric switch for said motor; a rotary member adapted to drivingly engage said reel in a predetermined one of a plurality of positions; manually operable means for controlling the movement of said rotary member during a cycle of operation; means for closing said switch and thereby energizing said motor upon manipulation of said manually operable means; means driven by said motor to engage said rotary member with said reel; means driven by said motor to rotate said rotary member when said rotary member is engaged with said reel; a knife actuating lever; a switch actuating lever, engageable with said knife actuating lever; and a cam driven by said motor to engage said knife lever and actuate said knife in a ticket severing direction, at the close of a cycle of operation of the machine; said switch actuating lever being actuatable by said knife lever, upon actuation of said knife lever in a ticket severing direction, to thereby open said switch and deenergize said motor.

22. A ticket issuing machine comprising: a reel for feeding a ticket strip; a rotary indexing member adapted to be selectively set to drivingly engage said reel in various positions; means for setting said indexing member for engagement with said reel, said means including a reciprocatory rack and manually operable means for controlling the extent of reciprocation of said rack; means for engaging said indexing member with said reel; and means operable on said rack to rotate said indexing member when said indexing member is drivingly engaged with said reel to thereby rotate said reel in a ticket issuing direction.

23. The machine defined in claim 22 and in which the manually operable means includes a plurality of selector keys operatively associated with key slides having stop members thereon, comprising the means for controlling the extent of reciprocation of said rack.

24. The machine defined in claim 22 and in which the manually operable means includes a plurality of selector keys operatively associated with key slides having stop members thereon, comprising the means for controlling the extent of reciprocation of said rack; and in which said means operable on said rack includes a pivotally mounted lever which is engaged with said rack, and a power driven cam operable on said lever to rotate it about its pivot to thereby move said lever in one direction and rotate said indexing member.

25. The machine defined in claim 22 and in which said rack normally tends to move in one direction; and which includes a trigger mechanism normally holding said rack in normal position; and in which said manually operable means includes means for tripping said trigger mechanism to thereby free said rack for movement in the direction in which it normally tends to move.

26. A ticket issuing machine comprising: a ticket delivery reel; a rotatably mounted indexing plate adapted to engage said reel in various positions; an electric motor operating only during a ticket issuing cycle of operation of said machine; means for engaging said indexing plate with said reel; means driven by said motor to drive said indexing plate when said indexing plate is engaged with said reel to thereby rotate said reel; a switch for controlling the operation of said motor; manually operable means; means associated with said manually operable means for setting said indexing plate for engagement with said reel; means normally holding said switch in open position, said means being rendered ineffective upon manipulation of said manually operable means so that said switch is allowed to close and thereby start the motor; a pivotally mounted switch lever having a normal and retracted position; a spring for moving said switch lever into retracted position during a cycle of operation of the machine; and means for moving said switch lever into normal position at the end of a cycle of operation of the machine to thereby open said switch and deenergize said motor.

27. A ticket issuing machine comprising: a ticket delivery reel; a rotatably mounted indexing plate adapted to engage said reel in various positions; an electric motor operating only during a ticket issuing cycle of operation of said machine; means for engaging said indexing plate with said reel; means driven by said motor to drive said indexing plate when said indexing plate is engaged with said reel to thereby rotate said reel; a switch for controlling the operation of said motor; manually operable means; means associated with said manually operable means for setting said indexing means for engagement with said reel; means normally holding said switch in open position, said means being rendered ineffective upon manipulation of said manually operable means so that said switch is allowed to close and thereby start the motor; a pivotally mounted switch lever having a normal and retracted position; means for moving said switch lever into retracted and normal position, said means including a knife actuating lever actuated in one direction by a cam driven by said motor during a cycle of operation of the machine and effective, when so actuated, to move said switch lever into normal position to thereby open said switch and deenergize said motor.

28. A ticket issuing machine comprising: a ticket delivery reel; a rotatably mounted indexing plate adapted to engage said reel in various positions; an electric motor operating only during a ticket issuing cycle of operation of said machine; means for engaging said indexing plate with said reel; means driven by said motor to drive said indexing plate when said indexing plate is engaged with said reel to thereby rotate said reel; a switch for controlling the operation of said motor; manually operable means; means associated with said manually operable means for setting said indexing means for engagement with said reel; means normally holding said switch in open position, said means being rendered ineffective upon manipulation of said manually operable means so that said switch is allowed to close and thereby start the motor; a pivotally mounted switch lever having a normal and retracted position; a ticket severing knife; means for positively reciprocating said switch lever, said means including a knife actuating lever, and a cam driven by said motor and engageable with said knife actuating lever to retract said knife from, and return said knife to, ticket severing position during each cycle of operation of the machine.

29. The machine defined in claim 28 and in which the means for positively reciprocating said switch lever includes a pin and slot connection between said knife actuating lever and said switch lever; and in which said switch lever is effective, upon return to normal position by said knife actuating lever, to open said switch.

30. A strip ticket issuing machine comprising: a supporting member; a shaft rotatably journaled in said supporting member; a ticket delivery reel rotatably mounted on said shaft; an indexing plate slidably mounted on said shaft and adapted to drivingly engage, in various positions, said ticket delivery reel; a motor; means driven by said motor for rotating said reel; manually operable means for limiting the extent of movement of said shaft; a knife for severing issued tickets from the strip; a pivotally mounted lever for actuating said knife; and a cam driven by said motor and effective to turn said lever in ticket severing direction.

31. A strip ticket issuing machine comprising: a supporting member; a shaft rotatably journaled in said supporting member; a ticket delivery reel rotatably mounted on said shaft; an indexing plate slidably mounted on said shaft for rotation therewith and adapted to drivingly engage said ticket delivery reel in any one of a plurality of positions, said one position in any cycle of operation being predetermined by the number of tickets to be issued in that cycle of operation; a motor; means driven by said motor for rotating said reel; manually operable means for limiting the extent of movement of said shaft; a knife for severing issued tickets from the strip, said knife having a retracted and a normal or ticket severing position; a pivotally mounted lever for actuating said knife; a cam driven by said motor and effective during a cycle of operation of the machine to actuate said lever in one direction to retract said knife from normal position before a ticket has been issued, and effective during the same cycle of operation to actuate said lever in the other direction to move said knife into ticket severing position after the proper number of tickets have been issued from the machine.

32. The machine defined in claim 31 and which includes: a switch for said motor; a pivotally mounted switch lever having a normal and retracted position; a pin and slot connection between said knife actuating lever and said switch lever whereby said knife actuating lever is effective to retract said switch lever when said knife actuating lever is retracted by said cam, and to move said switch lever back to normal position, and thereby open said switch, when said knife actuating lever is moved into ticket severing position by said cam.

33. A ticket strip issuing machine comprising: a rotary feeding member for said strip; an indexing member adapted to drivingly engage said feeding member, said indexing member being normally out of engagement with said rotary feeding member; means for setting said indexing member for engagement with said rotary feeding member in a predetermined position; means for engaging said indexing member with said rotary feeding member; power operated means operative on said indexing member, after engagement of said indexing member with said rotary member, to return said indexing member to normal position and thereby rotate said feeding member through a ticket issuing movement; means for holding said rotary feeding member against rotation when said indexing member is out of engagement with said feeding member.

34. A ticket issuing machine comprising: a ticket feed reel; driving means; a rotatable member adapted to be set to drivingly engage said reel in various positions; means controlling the setting of said rotatable member; means whereby actuation of the controlling means serves to initiate action of the driving means; means for engaging said rotatable member with said reel; means driven by said driving means to rotate said rotatable member when said rotatable member is in driving engagement with said reel; means for locking said reel against rearward rotation; means for positioning said reel upon completion of a ticket issuing cycle of operation, said means being spring-urged in one direction; and means for positively locking said reel from forward or ticket issuing rotation when said rotatable member is not engaged with said reel.

35. A ticket issuing machine comprising: a ticket feed reel; driving means; a rotatable member adapted to be set to drivingly engage said reel in various positions; means for setting said rotatable member, including a reciprocatory rack; a plurality of selector keys controlling the extent of movement of said rack and thereby controlling the setting of said rotatable member; means whereby actuation of one of said selector keys serves to initiate action of the driving means; means for engaging said rotatable member with said reel; means driven by said driving means to move said rack in one direction when said rotatable member is in driving engagement with said reel, and thereby rotate said member and said reel; and means for automatically locking said selector keys and thereby preventing operation of the machine when only a predetermined minimum number of tickets remain in the machine.

36. A strip ticket issuing machine comprising: a casing; a magazine within said casing for holding a strip of tickets; a reel within said casing for feeding a ticket strip outwardly from said casing; a rotary indexing member adapted to be set to drivingly engage said reel in various positions; manually operable means for initiating a ticket issuing cycle of operation of said machine; means controlled by said manually operable means for controlling the setting of said indexing member; means for engaging said rotary indexing member with said reel after said indexing member has been set; means for rotating said indexing member after said indexing member is engaged with said reel to thereby issue a predetermined number of tickets from the said casing; a pair of rollers within said casing, between said reel and said magazine and over which said tickets are fed during a ticket issuing cycle of operation of said machine; and means for locking said manually operable means against manipulation when a ticket is not disposed on said rollers.

37. A strip ticket issuing machine comprising: a casing; a magazine within said casing for holding a strip of tickets; a reel within said casing for feeding a ticket strip outwardly from said casing; a rotary indexing member adapted to be set to drivingly engage said reel in various positions; manually operable means for initiating a ticket issuing cycle of operation of said machine; means controlled by said manually operable means for controlling the setting of said indexing member; means for engaging said rotary indexing member with said reel after said indexing member has been set; means for rotating said indexing member after said indexing member is engaged with said reel to thereby issue a predetermined number of tickets from the said casing; a spring urged lever, said lever pressing against the ticket strip between said reel and said magazine during normal operation of the machine, and said lever being effective to lock said manually operable means against manipulation when no tickets are in position against which it can press.

38. A ticket issuing machine for delivering one or more tickets during a cycle of operation of the machine, and comprising: ticket feeding means, said means including a reel and a rotatable indexing member substantially in axial alignment with said reel; means for driving said indexing member; means for drivingly connecting said indexing member to said reel; a plurality of selector keys for controlling the relative position of said indexing member with said reel at the time of connection; and means for locking said selector keys against operation when the ticket supply in said machine, issuable by said reel, is less than a predetermined minimum.

39. In a ticket issuing machine of the type which includes a ticket feed reel, means for driving said reel through a ticket issuing cycle of operation, and keys for controlling the operation of said machine, an indexing member driven by said driving means and comprising an annular disc-shaped portion, a hub member projecting from said annular portion, and a pin yieldably mounted in said annular portion and adapted to drivingly engage said reel.

40. In a ticket issuing machine of the type which includes a shaft, a ticket feed reel rotatably mounted on said shaft, driving means, and keys for controlling the operation of the machine, the combination of, an indexing member slidably mounted on said shaft for rotation therewith, said indexing member having a yieldably mounted pin projecting therefrom for driving engagement with said reel; a lever; and means operable on said lever during an operation of the machine to press said indexing member into position wherein said pin drivingly engages said reel.

41. In a ticket issuing machine of the type which includes a shaft, a ticket feed reel rotatably mounted on said shaft and having openings formed therein, driving means, and keys for controlling the operation of the machine, the combination of: an indexing member slidably mounted on said shaft for rotation therewith, and having a pin yieldably mounted therein; a lever; and a cam driven by said driving means and operable on said lever to slide said indexing member on said shaft and thereby engage said pin with said reel in one of said openings.

42. In a machine of the character described and which includes a rotatably mounted shaft, a ticket feed reel rotatably mounted on said shaft, driving means, and keys for controlling the operation of the machine, the combination of a pinion on said shaft; an indexing member mounted on said shaft for rotation therewith and adapted to drivingly engage said reel; a slidably mounted rack having the teeth thereof drivingly associated with the teeth of said pinion; means for reciprocating said rack; and a cam driven by said driving means during an operation of the machine to drivingly engage said indexing member with said reel.

43. A ticket issuing machine comprising a rotatably mounted ticket delivery reel; a rotatable indexing member slidably mounted with respect to said reel; a motor; means driven by said motor during an operation of the machine for sliding said indexing member into driving engagement with said reel; means for reciprocating said indexing member, said means comprising a device driven by said motor to rotate said indexing member in one direction; and manually operable means for limiting the extent of rotation of said indexing member.

44. A ticket issuing machine comprising a rotatably mounted ticket delivery reel; a rotatably mounted indexing member operatively associated with said reel; a slidably mounted rack operatively connected to said indexing member; a lever mounted upon a substantially stationarily positioned pivot and operatively associated with said rack; a motor; means for reciprocating said rack and thereby turning said indexing member, said means including a cam driven by said motor to rotate said lever about the said pivot and to thereby move said rack in one direction; and digitally operable means for selectively limiting the extent of movement of said rack.

45. A ticket issuing machine comprising a rotatably mounted ticket delivery reel; a rotatably mounted indexing member operatively associated with said reel; a slidably mounted rack operatively connected to said indexing member; a lever mounted intermediate its end portions upon a substantially stationarily positioned pivot and having one end thereof connected to said rack; a motor; means for reciprocating said rack and thereby turning said indexing member and said reel, said means including a cam driven by said motor to rotate said lever about the said pivot and thereby move said rack in one direction; and digitally operable means for controlling the initiation of a cycle of operation of the machine and for selectively limiting the extent of movement of said rack.

46. A ticket issuing machine comprising a supporting member; a ticket delivery reel rotatably mounted on said supporting member; a rotatable indexing member slidably mounted with respect to said reel; means for setting said indexing member in various predetermined positions for engagement with said reel; means for sliding said indexing member into driving engagement with said reel after said indexing member has been set in one of said positions; a motor; means driven by said motor for rotating said indexing member; and manually operable means for initiating a cycle of operation of said machine.

47. A ticket issuing machine comprising a ticket feed reel; a rotatably mounted indexing member operatively associated with said reel; a reciprocable rack operatively associated with said indexing member to reciprocate the latter; a motor; means driven by said motor for moving said rack in one direction; a switch controlling said motor; digitally operable means for effecting closing of said switch and controlling the extent of reciprocation of said rack; means for locking said digitally operable means in position upon closing of said switch; and means automatically operable to release said locking means from said digitally operable means and thereby open said switch at substantially the close of a cycle of operation of said machine.

48. The machine defined in claim 28 and which includes means for locking said manually operable means upon closing of said switch; and in which said switch lever is effective, upon return to normal position by said knife actuating lever, to release said locking means and open said switch.

49. In a machine of the character described embodying a ticket feed wheel which is driven in a ticket issuing direction by a rack which has a normal and an actuated position and which rack is set in operation under control of manually operable means which are effective to initiate a cycle of operation of said machine, a trigger mechanism for holding said rack in normal position and comprising a latching member normally in latching engagement with said rack, means engaged by said manually operable means upon manipulation of the latter to release said latching member from latching engagement with said rack, and a pivoted lever having one portion thereof in engagement with said rack and adapted to move said releasing means out of engagement with said digitally operable means when said rack is set in operation under control of said manually operable means.

50. In a machine of the character described embodying a ticket feed wheel which is driven in a ticket issuing direction by a rack which has a normal and an actuated position and which rack is set in operation under control of manually operable means which are effective to initiate a cycle of operation of said machine, a trigger mechanism for holding said rack in normal position and comprising a pivotally mounted link, a latching member mounted on said link and normally in latching engagement with said rack, tripping means pivotally mounted on said link and adapted to be engaged by said manually operable means to release said latching member from said latching engagement with said rack, and means engaging said rack and adapted to move said releasing means out of engagement with said manually operable means when said rack is set in operation under control of said manually operable means.

51. In a ticket issuing machine of the character described and which includes a ticket feed reel, a rack having a normal and an actuated position and adapted to drive said wheel in a ticket-feeding direction, means for driving said rack, and a plurality of keys for selectively controlling the operation of said machine, the combination of a trigger mechanism comprising a pivotally mounted link, a latching member pivotally mounted on said link normally in latching engagement with said rack, a trip member pivotally mounted on, and depending from, said link and adapted, when moved in one direction to release said latching member from latching engagement with said rack, a pivotally mounted lever in engagement with said rack and adapted to raise said trip member when said rack is moved in one direction, and a spring urging said trigger mechanism toward latching engagement with said rack; and a plurality of actuating members each adapted to be manipulated by a respective one of said keys to engage said trip member and thereby release said latching member; said trip member being effective upon restoration of said rack to normal position to block the reflective manipulation of further keys until a previously manipulated key is moved from manipulated position.

52. In a ticket machine comprising a plurality of ticket-issuing units the combination of a rotatably mounted drive shaft common to all of said units; a ticket feed reel in each of said units; an indexing member in each of said units; means including a cam driven by said drive shaft for operatively engaging said indexing member with said feed reel; a reciprocably mounted rack operatively associated with each of said indexing members; means including a cam driven by said drive shaft for reciprocating said rack and thereby turning said indexing member; digitally operable means for selectively controlling the extent of turning of said indexing members; and driving means effective upon manipulation of said digitally operable means to rotate said drive shaft.

53. In a ticket machine comprising a plurality of ticket-issuing units the combination of a rotatably mounted drive shaft common to all the units; a ticket feed reel in each of said units; an indexing member in each of said units; means including a cam driven by said drive shaft for operatively engaging said indexing member with said feed reel; a reciprocably mounted rack operatively associated with each of said indexing members; means including a cam driven by said drive shaft for reciprocating said rack and thereby turning said indexing member; digitally operable means for selectively controlling the extent of turning of said indexing members; a motor operatively associated with said drive shaft; a switch for said motor; means effective to close said switch upon manipulation of said digitally operable means; and a cam-driven reciprocably mounted switch lever having a normal and an actuated position.

54. The machine defined in claim 53 and which includes means for positively reciprocating said switch lever, said means for reciprocating said switch lever including a lever actuated by said drive shaft and having a pin and slot connection with said switch lever.

55. The machine defined in claim 53 and which includes ticket severing means, said ticket severing means including an actuating lever operatively associated with one of said cams to be reciprocated thereby during a cycle of operation of the machine; and which includes means for positively reciprocating said switch lever during a cycle of operation of the machine, said means for positively reciprocating said switch lever including a pin and slot connection between said actuating lever and said switch lever; and in which said switch lever is effective, upon return to normal position, to open said switch.

56. A ticket issuing machine comprising a ticket feed reel; a motor; a rotatable member adapted to drivingly engage said reel; manually operable means for controlling operation of said machine; a pivotally mounted lever; a cam driven by said motor to rotate said lever and thereby engage said rotatable member with said reel; and means driven by said motor to rotate said rotatable member when said member is in driving engagement with said reel.

57. A ticket issuing machine comprising a ticket feed reel; a motor; a rotatable member adapted to engage said reel; manually operable means for controlling operation of said machine; a cam driven by said motor; means driven by said cam during driving thereof by said motor to engage said rotatable member with said reel; and means driven by said motor to rotate said rotatable member when said member is in driving engagement with said reel.

CARL DODEGGE.